US008739200B2

(12) United States Patent
McQuaide, Jr.

(10) Patent No.: US 8,739,200 B2
(45) Date of Patent: May 27, 2014

(54) METHODS, SYSTEMS, AND PRODUCTS FOR DISTRIBUTING DIGITAL MEDIA

(75) Inventor: Arnold Chester McQuaide, Jr., Berkeley Lake, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1019 days.

(21) Appl. No.: 11/973,935

(22) Filed: Oct. 11, 2007

(65) Prior Publication Data
US 2009/0100480 A1    Apr. 16, 2009

(51) Int. Cl.
*H04N 7/16*        (2011.01)
*H04N 21/432*      (2011.01)

(52) U.S. Cl.
CPC ............................ *H04N 21/4325* (2013.01)
USPC ...................................................... 725/29

(58) Field of Classification Search
CPC .................................................. H04N 21/4325
See application file for complete search history.

(56) References Cited

U.S. PATENT DOCUMENTS

| | | |
|---|---|---|
| 5,924,013 A | 7/1999 | Guido |
| 6,141,530 A | 10/2000 | Rabowsky |
| 6,169,877 B1 | 1/2001 | Gulla |
| 2001/0019612 A1 | 9/2001 | Kitani |
| 2002/0056118 A1 | 5/2002 | Hunter |
| 2005/0138654 A1 | 6/2005 | Minne |
| 2005/0204394 A1 | 9/2005 | Nguyen |
| 2006/0075441 A1* | 4/2006 | Gauba et al. ................ 725/89 |
| 2006/0178901 A1 | 8/2006 | Cooper |
| 2006/0212908 A1 | 9/2006 | Hunter |
| 2007/0089124 A1* | 4/2007 | Bond ............................ 725/8 |
| 2007/0233701 A1* | 10/2007 | Sherwood et al. ........... 707/10 |
| 2007/0283449 A1* | 12/2007 | Blum et al. ................. 726/28 |
| 2008/0168515 A1* | 7/2008 | Benson et al. ............ 725/110 |
| 2009/0019485 A1* | 1/2009 | Ellis et al. ................. 725/40 |
| 2009/0083807 A1* | 3/2009 | Stephan et al. ............. 725/87 |
| 2009/0177519 A1* | 7/2009 | Tota et al. ................... 705/10 |

* cited by examiner

*Primary Examiner* — Nathan Flynn
*Assistant Examiner* — Omar S Parra
(74) *Attorney, Agent, or Firm* — Scott P. Zimmerman, PLLC

(57) ABSTRACT

Methods, systems, and products are disclosed for advanced distribution of digital media. A list of subscriber addresses to a new release of a digital media is retrieved at a server associated with a producer. An electronic copy of the digital media is sent from the server to a subscriber's address in the list of subscribers. The electronic copy of the digital media is stored in a memory of a device and may be retrieved at a specified date. The memory may have a partitioned portion that is dedicated to new releases of media offered by the producer. A cost associated with the device and/or the digital media is subsidized by the producer, such that only the producer, the subscriber, and/or a service/network provider have access to the partitioned portion of the memory.

17 Claims, 16 Drawing Sheets

ND PRODUCTS FOR
METHODS, SYSTEMS, AND PRODUCTS FOR DISTRIBUTING DIGITAL MEDIA

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Exemplary embodiments generally relate to data processing and to interactive video distribution systems and, more particularly, to business practices, to transceivers, and to user-requested video systems.

The distribution of newly-released movies and games can be improved. Currently, new movie releases are distributed to theaters at great costs to production companies. Similarly, electronic games and other digital media are distributed to retailers and rental operations at great costs. The public then must travel to these theaters to view the movies or to retailers/renters to obtain the games. Even pay-per-view programming and movie downloads have limitations and associated costs. These current distribution channels ignore the savings offered by broadband access and by advances in consumer electronics devices.

SUMMARY

The exemplary embodiments provide methods, systems, and products for distributing movies, games, and other digital media. Exemplary embodiments utilize increasingly ubiquitous broadband access, and advances in memory devices, to create a cheaper and more pleasing distribution channel for new releases of digital media. Exemplary embodiments retrieve a list of subscriber addresses to a new release of digital media. An electronic copy of the digital media is sent from a producer's server to a subscriber's address in the list of subscribers. The electronic copy of the digital media is stored in a memory of the subscriber's device, the memory having a partitioned portion that is dedicated to new releases of media offered by the producer. A cost associated with the device and/or the digital media may be subsidized by the producer, such that only the producer, the subscriber, and/or a service/network provider have access to the partitioned portion of the memory. Exemplary embodiments may even block access to the digital media, such the digital media is unavailable until a specified date. Exemplary embodiments thus implement a lower cost of distribution and an innovative use of digital rights management.

More exemplary embodiments include a system for distributing digital media. Exemplary embodiments include means for retrieving, at a producer's server, a list of subscriber addresses to a new release of a digital media. An electronic copy of the digital media is sent from the producer's server to a subscriber's address in the list of subscribers. Means are included for storing the electronic copy of the digital media in a memory of a device, the memory having a partitioned portion that is dedicated to new releases of media offered by the producer. The electronic copy of the digital media may be pre-distributed, such that the digital media is unavailable until a specified date. Means are also included for subsidizing a cost associated with the device and/or the digital media, such that only the producer, the subscriber, and/or a service/network provider have access to the partitioned portion of the memory.

Other exemplary embodiments describe a computer program product for distributing digital media. A server associated with a producer retrieves a list of subscriber addresses to a new release of a digital media. An electronic copy of the digital media is sent from the producer's server to a subscriber's address in the list of subscribers. The electronic copy of the digital media is stored in a memory of a device, the memory having a partitioned portion that is dedicated to new releases of media offered by the producer. A cost associated with the device and/or the digital media is subsidized by the producer, such that only the producer, the subscriber, and/or a service/network provider have access to the partitioned portion of the memory.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
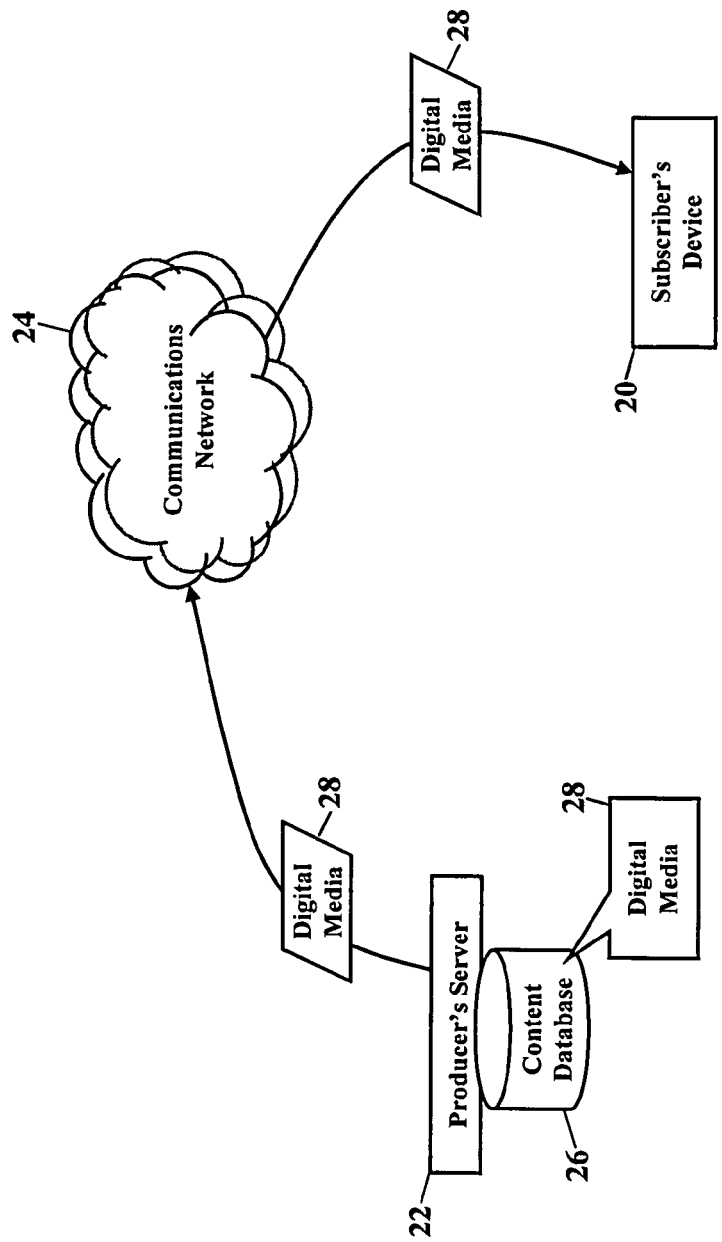
FIG. 1 is a simplified schematic illustrating the exemplary embodiments.

FIG. 1 is a simplified schematic illustrating exemplary embodiments. FIG. 1 illustrates a new distribution channel for new releases of films, programs, games, and other digital media. Here, when digital media is ready for release or premier, the digital media is distributed directly to residential subscribers. The digital media need not be exclusively distributed to theaters, retailers, and other channels. That is, the producer may distribute a new release of a movie, for example, directly to residential or individual subscribers, members, and other non-traditional, but authorized, recipients. Exemplary embodiments permit these authorized recipients to enjoy newly released or available digital media in the comfort of their own choosing. Recipients, for example, need not travel to theaters to view a new release of a movie. Nor do the recipients need to take action to order, download, or similarly arrange for delivery. Similarly, authorized recipients need not travel to a merchant to purchase a newly released DVD. The media, instead, is communicated directly from the producer to the recipient, thus reducing the expense and inconvenience of current distribution channels. Exemplary embodiments thus permit film production companies and other media providers to deliver new release media directly to potential audiences at the time of première (or at any other time of the producer's choosing). Exemplary embodiments facilitate a coupling of new release media with Internet-based promotions, thus lowering distribution and marketing costs. Exemplary embodiments provide a new opportunity for service providers (such as IPTV providers, broadband providers, and cable companies) to become a key element in the distribution of major motion pictures, games, and other media. Exemplary embodiments also offer the potential of making movies, games, and other media immediately available in individual households—at very little cost to the production companies. Exemplary embodiments thus implement a lower cost of distribution and an innovative use of video recording and digital rights management.

FIG. 1 is a simple illustration of this new distribution channel. A subscriber's device 20 communicates with a producer's server 22 via a communications network 24. As later paragraphs will explain, the subscriber's device 20 may be a computer, digital video recorder, television, set-top box, or any other device. The producer's server 22 communicates with a content database 26 that stores digital media 28. The digital media 28 may have been produced by a producer associated with the producer's server 22. That is, the producer may have recorded, produced, distributed, funded, or sponsored the digital media 28. The producer, for example, may be DISNEY®, PARAMOUNT®, FOX®, NEWS CORPORATION®, ENTERTAINMENT ARTS®, or any other entity that makes media available to the subscriber's device 20. When the producer wishes to distribute the digital media 28, the producer's server 22 retrieves the digital media 28 from the content database 26. The producer's server 22 then sends or communicates the digital media 28 via the communications network 24 to the subscriber's device 20.

The subscriber's device 20 may be associated with a distribution plan or program. With this plan the digital media 28 may be distributed directly to subscribers. The term "subscriber," however, may be synonymous with "user," "member," "residential customer," "participant," or any other term denoting an authorized recipient of the digital media 28. The producer may also distribute or send the digital media 28 to a theater or device operating in the theater. Exemplary embodiments, however, create a distribution channel directly to the individual subscriber's device 20, such as a home computer, a laptop, a phone, or any other device. When the subscriber's device 20 receives the digital media 28, the digital media 28 is stored in the subscriber's device 20. Exemplary embodiments may thus describe a subscription-based plan in which the producer's new releases of movies, programs, games, or other media is directly distributed or communicated to authorized subscribers. Later paragraphs will also explain how billing may be arranged for the subscription plan and/or for storage and retrieval of the digital media 28.

Exemplary embodiments thus leverage advances in technology. As broadband access becomes common to residential customers, and as memory/storage costs continue to drop, exemplary embodiments create a new distribution channel to individual households and devices. Advances in consumer electronics (such as high definition video and surround sound audio) permit residential customers to have a viewing experience that rivals, or may be superior to, the theater experience. Exemplary embodiments thus include an innovative business model which offers the possibility for broadband distribution of the digital media 28 to individual households and/or individual subscriber devices 20.

Exemplary embodiments may be applied regardless of networking environment. The communications network 24 may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

Many schemes for distributing digital media are known and, thus, not further discussed. If the reader desires more details, the reader is invited to consult the following sources: U.S. Pat. No. 5,924,013 to Guido, et al.; U.S. Pat. No. 6,141,530 to Rabowsky, et al.; U.S. Pat. No. 6,169,877 to Gulla'; U.S. Patent Application Publication 2001/0019612 to Kitani, et al; U.S. Patent Application Publication 2002/0056118 to Hunter, et al; U.S. Patent Application Publication 2005/0138654 to Minne, et al; U.S. Patent Application Publication 2005/0204394 to Nguyen; U.S. Patent Application Publication 2006/0178901 to Cooper; and U.S. Patent Application Publication 2006/0212908 to Hunter, et al.

Figure 2:
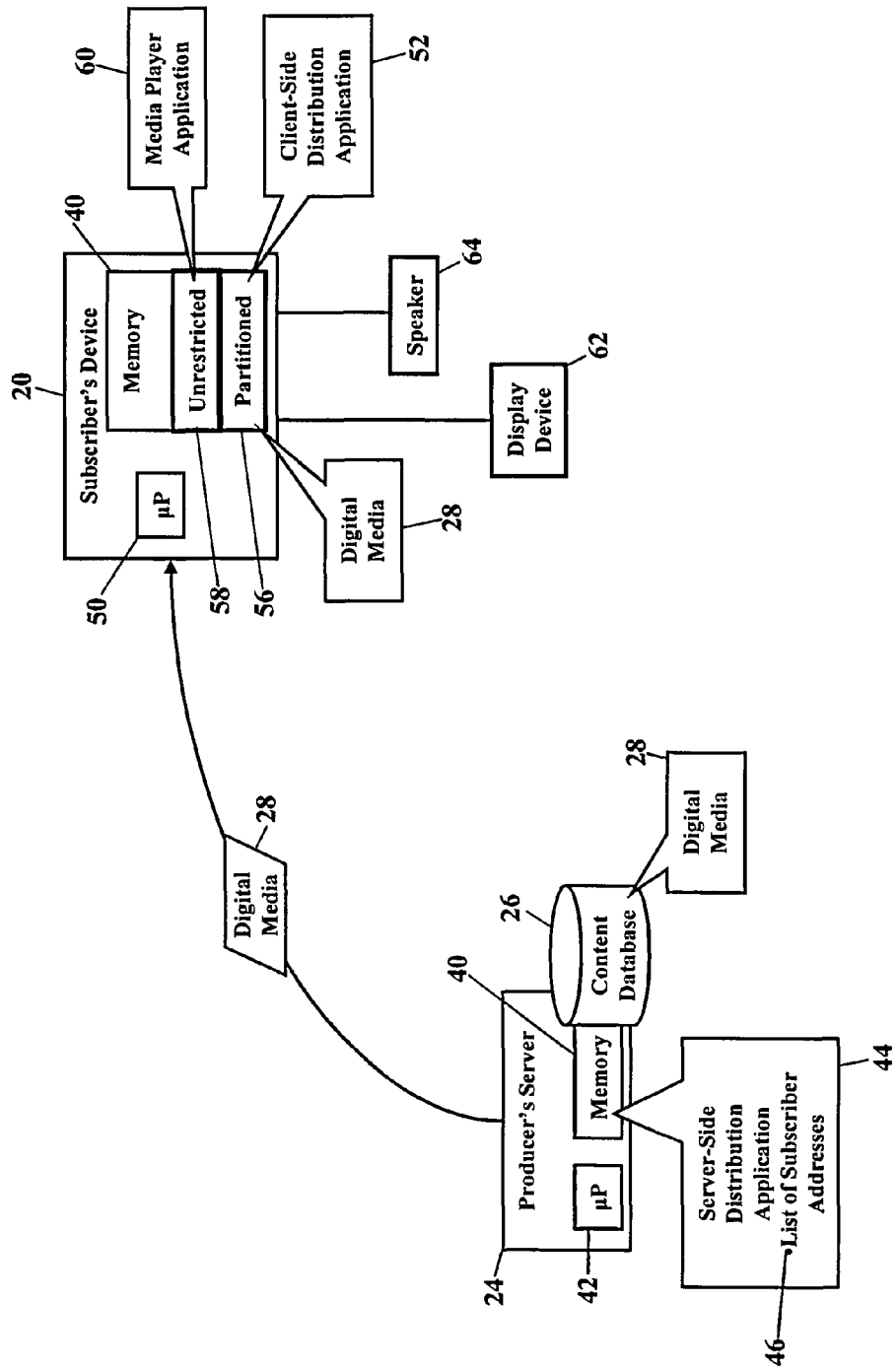
FIG. 2 is a more detailed schematic illustrating the new distribution channel for media, according to more exemplary embodiments.

FIG. 2 is a more detailed schematic illustrating the new distribution channel for media, according to more exemplary embodiments. The producer's server 22 accesses and retrieves the digital media 28 stored in the content database 26. The content database 26 is illustrated as being locally stored in a memory 40 of the producer's server 22, yet the content database 26 may be remotely accessible (via the communications network 24 illustrated in FIG. 1). The producer's server 22 has a processor 42 (e.g., "µP"), application specific integrated circuit (ASIC), or other similar device that executes a server-side distribution application 44 stored in the memory 40. The server-side distribution application 44 is a set of processor-executable instructions that causes distribution of the digital media 28. When the producer wishes to distribute the digital media 28, the server-side distribution application 44 accesses a list 46 of subscriber addresses to the distribution plan. The list 46 of subscriber addresses is illustrated as being retrieved from the memory 40 of the producer's server 22, yet the list 46 of subscriber addresses may be remotely stored and accessed via the communications network 24. The list 46 of subscriber addresses may include names, physical addresses, communications addresses (e.g., email addresses, phone numbers, pager addresses), machine access codes, and/or Internet Protocol addresses associated with each subscriber to the distribution plan for the producer's new releases of media. When the producer distributes the digital media 28, the digital media 28 is streamed or downloaded to each subscriber address in the list 46 of subscriber addresses, such that only authorized subscribers to the distribution plan receive the new release of the digital media 28.

The subscriber's device 20 receives the digital media 28. The subscriber's device 20 has a processor 50 (e.g., "µP"), application specific integrated circuit (ASIC), or other similar device that executes a client-side distribution application 52 stored in a memory device 54. The client-side distribution application 52 may be a set of processor-executable instructions that receives, stores, and retrieves the digital media 28. The client-side distribution application 52 may thus cooperate with the server-side distribution application 44 to make the digital media 28 available for enjoyment, according to the subscription plan.

The digital media 28 may be stored in dedicated memory. The memory device 54 may have a dedicated, partitioned portion 56 that is partitioned from use by other applications. That is, the client-side distribution application 52 may create, reserve, or have exclusive access to the partitioned portion 56 of the memory device 54. A separate, undedicated, or unrestricted portion 58 of the memory device 54 may be available to other applications. The partitioned portion 56 may be logically or physically divided from other memory such that only the producer's new releases of movies, games, and other media may be storable and retrievable from the partitioned portion 56 of the memory device 54. The partitioned portion 56, for example, may be a part or division of memory (e.g., dedicated sectors or cells) in a computer, set-top box, receiver, or television. The partitioned portion 56 may even be a separate memory storage device, such as a separate optical or magnetic hard drive or a separate random access memory device. Regardless, the partitioned portion 56 is restricted to use only by the producer, such that the partitioned portion 56 is inaccessible to other producers and to other applications. Only the digital media 28 associated with the producer (or media associated with the producer's corporate affiliations) may be stored and retrieved from the partitioned portion 56 of the memory device 54. The unrestricted portion 58 of the memory device 54 is available to other applications.

When the subscriber wishes to enjoy the digital media 28, the subscriber retrieves the digital media 28 from the partitioned portion 56 of the memory device 54. The subscriber calls or invokes the server-side distribution application 44 and/or the client-side distribution application 52 to obtain access to the partitioned portion 56. An authentication procedure (such as a username and password) may be required to access the partitioned portion 56 of the memory device 54 and/or the digital media 28. When the subscriber is authenticated, the server-side distribution application 44 and/or the client-side distribution application 52 may permit the subscriber access to the digital media 28. The client-side distribution application 52, for example, may be prevented from accessing the digital media 28 before a specified time/date. The digital media 28 may include a logical flag or other software lock that prevents access prior to the specified date/time. The client-side distribution application 52, then, may compare the current date and time to the specified time/date. At the specified time/date, then, the digital media 28 may then be retrieved and played for the subscriber's enjoyment. A media player application 60, for example, may be invoked to present the digital media 28 to the subscriber. FIG. 2 illustrates the digital media 28 being visually presented on a display device 62 coupled to, or communicating with, the subscriber's device 20. The digital media 28 may additionally or alternatively have audible content that is audibly presented by a speaker 64, piezoelectric component, or other means. The digital media 28 may additionally or alternatively be communicated to another device or component for execution.

The client-side distribution application 52 may provide notifications when the subscriber accesses the digital media

28. When the digital media 28 is at least partially retrieved from the partitioned portion 56 of the memory device 54, then the client-side distribution application 52 may cause a notification message to be sent. This notification message may be sent to the server-side distribution application 44, thus informing the server-side distribution application 44 that the subscriber has retrieved the digital media 28. The notification message, however, may additionally or alternatively be sent to a billing server. The billing server may then arrange payment for the digital media 28. There are many billing arrangements known to those of ordinary skill in the art, so these billing arrangements are not further discussed.

The partitioned portion 56 of the memory device 54 may be finite in size. As those of ordinary skill in the art understand, the partitioned portion 56 of the memory device 54 may have a maximum capacity above which no more content may be stored. The producer's server 22, then, cannot continually distribute digital media 28 without deleting, overwriting, or transferring older content from the partitioned portion 56. The client-side distribution application 52 and/or the server-side distribution application 44, therefore, may include software mechanisms for determining which digital media is removed from the partitioned portion 56 of the memory device 54. The digital media 28, for example, may have an date and/or time of expiration, after which the digital media 28 will be deleted or overwritten from the partitioned portion 56. Exemplary embodiments may prompt the subscriber to select what digital media 28 is removed from the partitioned portion 56 of the memory device 54. Exemplary embodiments may even prompt the subscriber to purchase or license a copy of the digital media 28, thus allowing the subscriber to transfer the purchased/licensed digital media 28 to another memory location.

Exemplary embodiments thus establish a new distribution channel for new releases of films, programs, games, and other digital media. The producer distributes the digital media 28 directly to subscribers. That is, the digital media 28 is directly sent to the subscriber's home computer, set-top box, decoder, phone or other device. The digital media 28 need not be exclusively distributed to theaters, retailers, and rental operations. The producer distributes their new releases directly to residential or individual subscribers of the subscription plan. These authorized recipients may enjoy the newly released digital media 28 in the comfort of their own choosing. Subscribers need not travel to travel to theaters to view a new release of a movie. Subscribers also need not place online orders, or mail orders, and then await electronic or physical delivery. The digital media 28, instead, is communicated directly from the producer's server 22 to the subscriber's device 20, thus reducing the expense and inconvenience of current distribution channels.

Here, then, the subscriber's device 20 becomes the distribution channel. Either directly or in partnership with a broadband service provider, the producer distributes the digital media 28 to the subscriber's device 20. The subscriber's device 20 may locally store the digital media 28, or the service provider may provide network-based storage for the digital media 28. A production company (perhaps SONY PICTURES®) may even provide the subscriber's device 20 (e.g. a digital video recorder) for a reduced fee (or free), with the memory device 54 at least partially dedicated to receive new releases from the production company. The producer may implement direct delivery of new content directly to the subscriber's device 20, and that new content may be made simultaneously available with, or in lieu of, a theater premiere, thus allowing, for example, nationwide premiere. Exemplary embodiments, then, may be attractive to service providers and to film production houses. In addition, the prospect of special promotions and "free" (or subsidized) DVR service may stimulate an individual subscriber's interest. Exemplary embodiments thus implement a lower cost of distribution and an innovative use of video recording and digital rights management.

Figure 3:
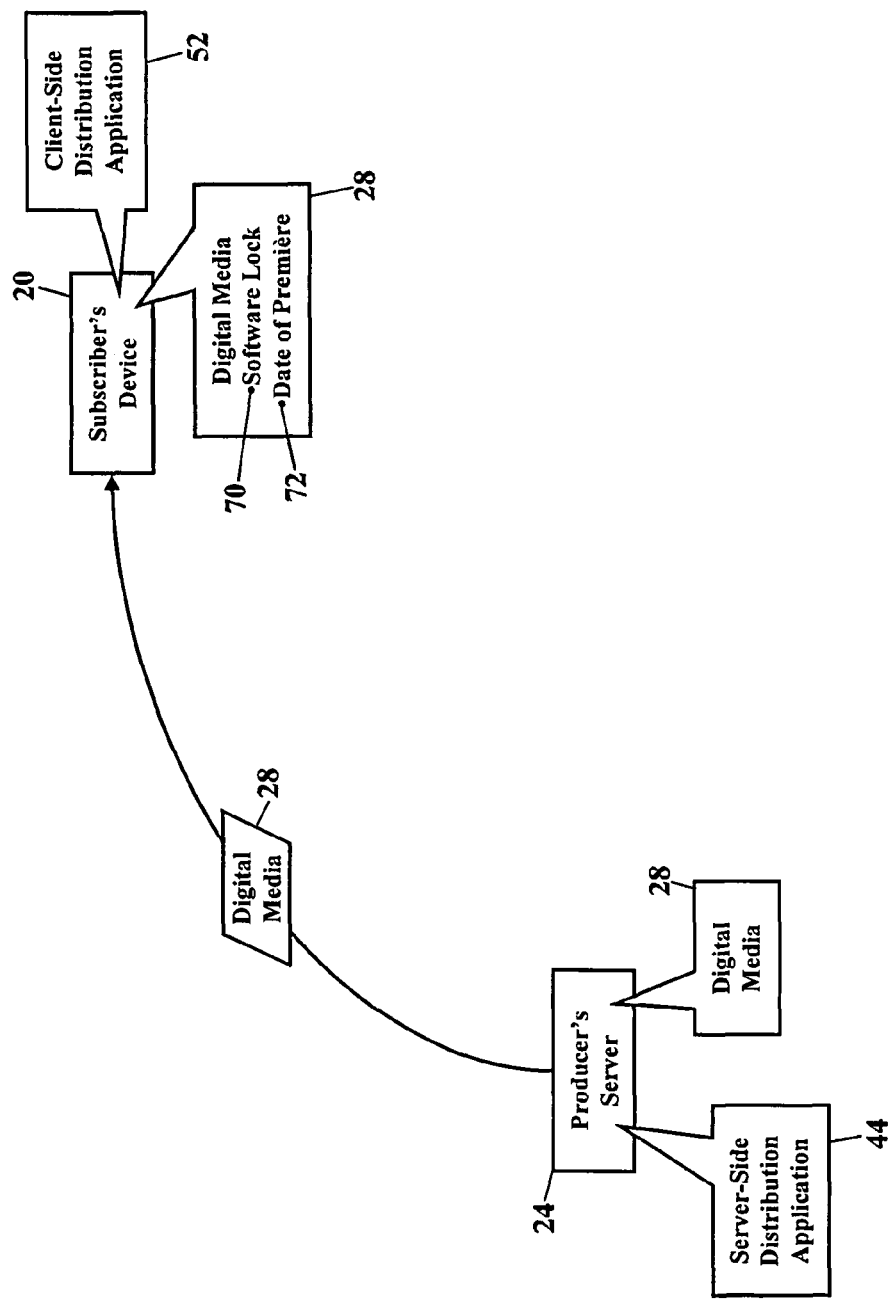
FIG. 3 is a schematic illustrating security measures for digital media, according to more exemplary embodiments.

FIG. 3 is a schematic illustrating security measures for the digital media 28, according to more exemplary embodiments. Here the digital media 28 may include a software lock 70 that prevents retrieval from the partitioned portion 56 of the memory device 54. The software lock 70 may also include conditions or codes that "release" the digital media 28, thus allowing the server-side distribution application 44 and/or the client-side distribution application 52 to permit retrieval from the partitioned portion of the memory device (illustrated, respectively, as reference numeral 56 and 54 in FIG. 2). The digital media 28, for example, may be inaccessible or irretrievable prior to a date 72 of première or release. A movie or game may have a première date on which is scheduled its first public showing or viewing. The producer may not want subscribers having access to the digital media 28 prior to the date 72 of première or release. Exemplary embodiments, then, may prevent retrieval of the digital media 28 from the partitioned portion 56 of the memory device 54 prior to the date 72 of première or release. On the date 72 of première or release, then, the software lock 70 may expire, thus making the newly released digital media 28 retrievable from the partitioned portion 56 of the memory device 54.

Figure 4:
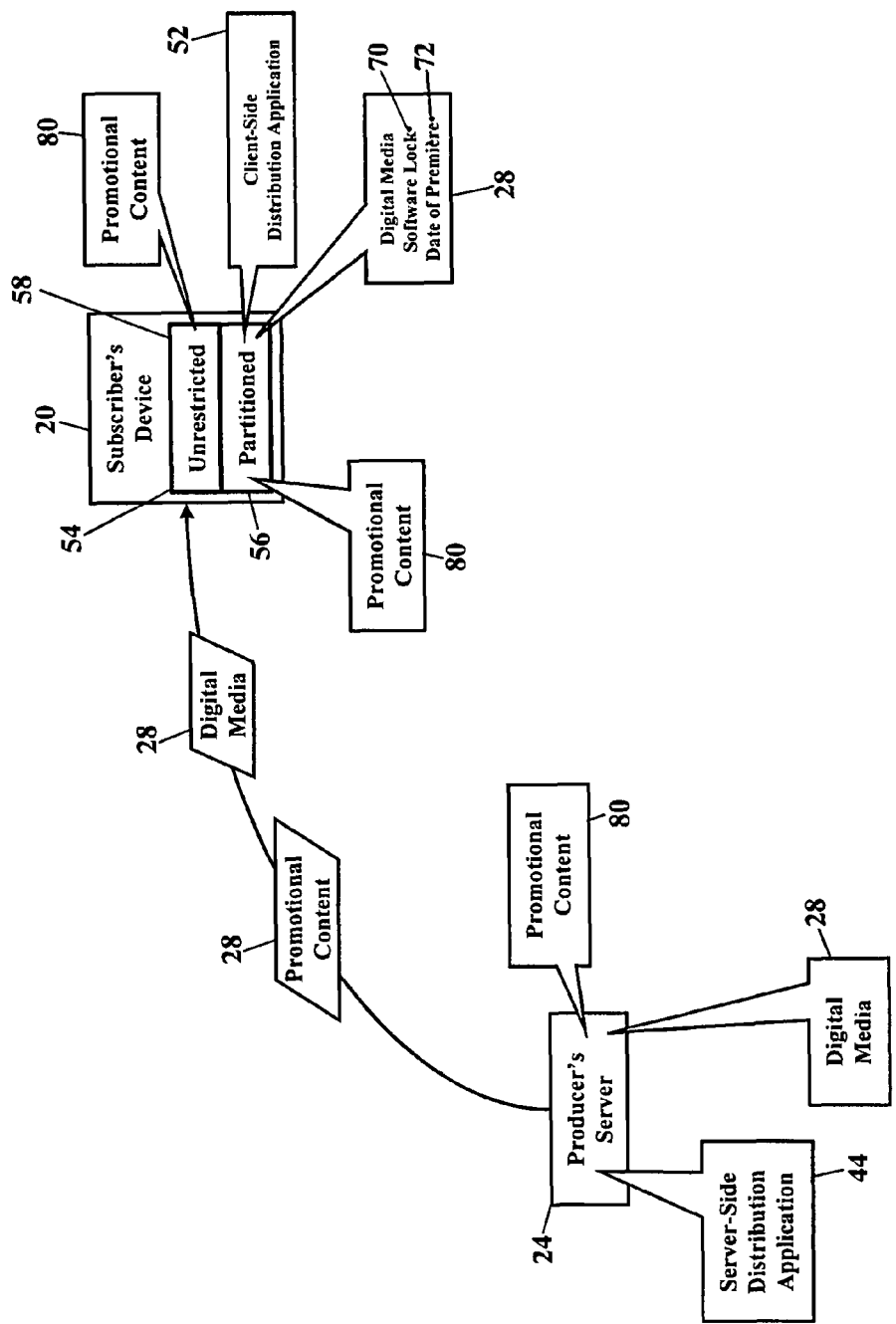
FIGS. 4 and 5 are schematics illustrating promotional content for digital media, according to more exemplary embodiments.
Figure 5:
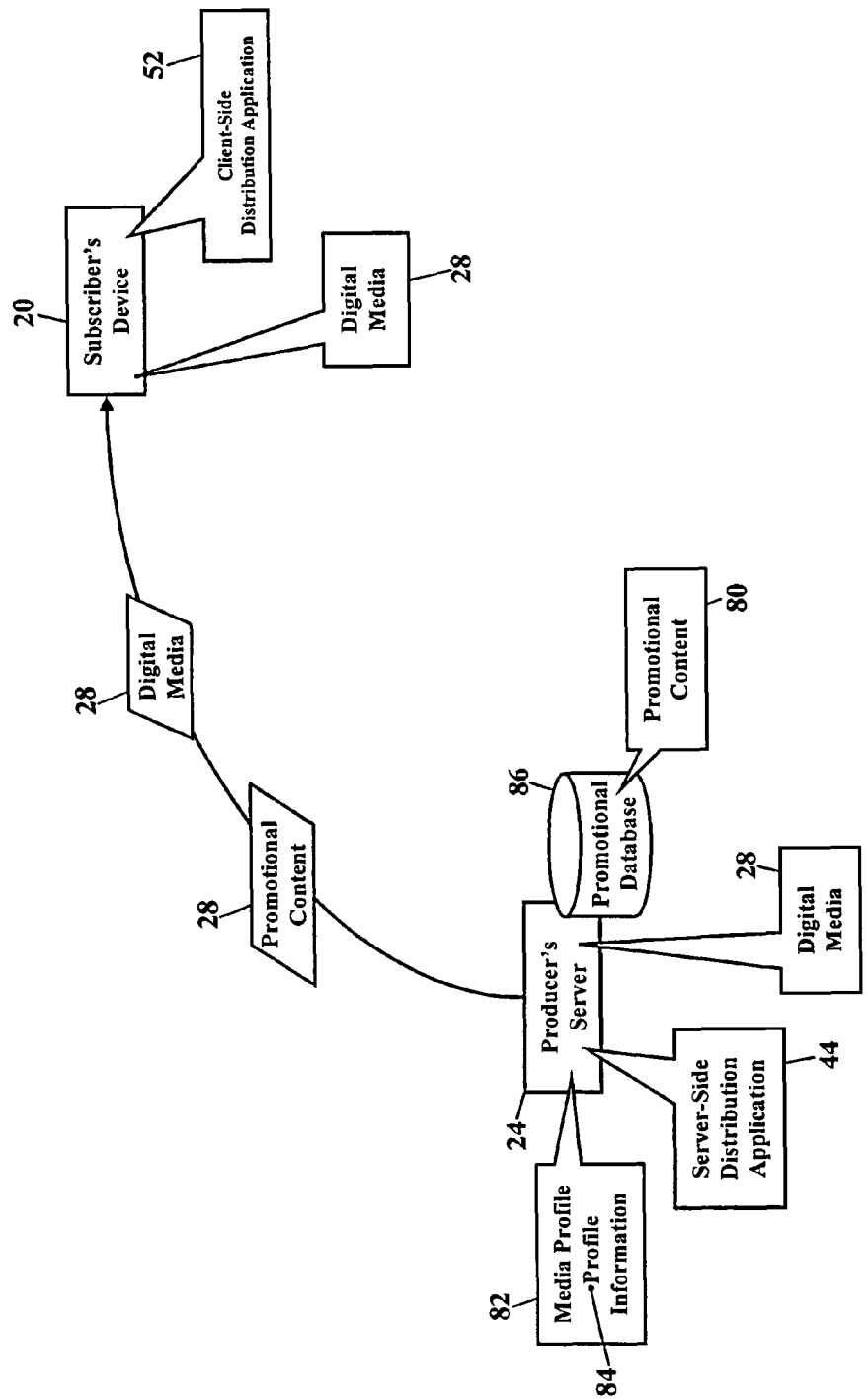

FIGS. 4 and 5 are schematics illustrating promotional content 80 for the digital media 28, according to more exemplary embodiments. Here exemplary embodiments may send, receive, store, and/or retrieve the promotional content 80 related to the digital media 28. That is, the promotional content 80 may be sent from the producer's server 22 to the subscriber's device 20. The subscriber's device 20 may then store the promotional content 80 to the memory device 54. The promotional content 80 may be any content that is related to the producer, to the digital media 28, or to other new releases of the producer's. The promotional content 80 may be a video segment, preview, or "clip" that promotes the digital media 28. The promotional content 80 may be previews of other upcoming, future new releases offered by the producer. The promotional content 80 may be a game or educational content associated with, or related to, the digital media 28. The promotional content 80 may be an electronic or printable coupon or sticker associated with, or related to, the digital media 28. The promotional content 80 may be advertisements related to, or unrelated to, the producer's products.

The promotional content 80, however, may or may not be restricted. Even though the digital media 28 may include the software lock 70 that prevents retrieval from the partitioned portion 56 of the memory device 54, the promotional content 80 may be retrievable prior to the date 72 of première or release. The server-side distribution application 44 and/or the client-side distribution application 52, for example, may store the promotional content 80 in the unrestricted portion 58 of the memory device 54, so that any application or device (such as a media player application) may access, retrieve, and execute the promotional content 80 at any time, even before or prior to the date 72 of première or release. Or, the promotional content 80 may be stored in the partitioned portion 56 of the memory device 54, and the promotional content 80 may have codes, settings, or programming that make the promotional content 80 unrestricted in access.

The promotional content 80 may comprises an event package. Because the promotional content 80 may be related to a new release of a movie or game, the promotional content 80 may have a theme that coincides with the digital media 28. Suppose, for example, that the new release of the digital media 28 is a romantic comedy movie. The promotional content 80, then may be romantically-themed to encourage subscribers to retrieve the movie. Initial revenues, after all, may be important in driving continued "buzz," profits, and perhaps industry awards. The promotional content 80, then, may be themed to encourage subscribers to retrieve and to watch the movie at, or near, the date 72 of première or release. The promotional content 80, for example, may be a coupon for flowers, candy, a dinner, or a weekend getaway that incentives subscribers to retrieve the romantic comedy, perhaps at a specified date or time. If the digital media 28 is an adventure or action game or movie, the promotional content 80 may be gift certificates to an amusement park, video arcade, laser tag facility, or other similarly-themed merchant. If the digital media 28 is a documentary or a drama, the promotional content 80 may be gift certificates or passes to museums, book stores, or other establishments that cater to those audiences. The promotional content 80, in short, may incentivize subscribers to retrieve and to watch the digital media 28 at, or near, the date 72 of première or release. The promotional content 80, of course, may incentivize subscribers, regardless of the date.

Other examples of the promotional content 80 are provided. The promotional content 80 may also be available through other distribution channels, including, but not limited to, distribution via a website that is only available to "subscribers." As an example, children who view educational content might be provided access to a web-based quiz that provides prizes or some kind of recognition, thus enhancing the retention of what was learned from the educational content. The promotional content 80 could even be provided in advance—that is, prior to a specified date or the date 72 of première or release. The promotional website may require entry of, or access to, a code that is obtained from the digital media 28 or from the producer's server 22. As earlier paragraphs explained, the subscriber's device 20, additionally or alternatively, may notify the producer's server 22 when the digital media 28 has been viewed. Once the producer's server 22 has been notified, the subscriber may then be permitted to access the "subscriber's only" website and obtain the promotional content 80 (such as a discount coupon). Suppose, for example, that the subscriber's device 20 notifies a software application associated with www.disneykids.com, where subscribers who have viewed the digital media 28 may login and claim a promotional item. The subscriber, for example, may claim a promotional t-shirt, print a sticker, poster, or picture, take a quiz, or enter a contest.

FIG. 5 illustrates profiling the promotional content 80. As the digital media 28 is produced, the producer may create or establish a media profile 82 of the digital media 28. The media profile 82 may include profile information 84 that describes the digital media 28. The profile information 84 may describe a theme or genre, actors or actresses, producer, location, content, scenes, or any other information associated with the digital media 28. The profile information 84 may include ratings information (such as that provided by the MOTION PICTURE ASSOCIATION OF AMERICAS® or religious organizations). The profile information 84, in short, may be any information and/or metadata that is associated with the digital media 28. The server-side distribution application 44 may then query a promotional database 86. The promotional database 86 maps, relates, or otherwise associates the profile information 84 to the promotional content 80. The promotional database 86 is illustrated as being locally stored in the producer's server 22, but the promotional database 86 may be remotely accessible via the communications network 24 (illustrated in FIG. 1). The server-side distribution application 44 queries the promotional database 86 for some or all of the profile information 84. The promotional database 86 then responds with the promotional content 80 associated with the profile information 84. The server-side distribution application 44 may then send or forward the promotional content 80 to the subscriber's device 20.

Another example helps explain the promotional content 80. Subscribers who share some common affinity may receive delivery of the digital media 28. Suppose the promotional content 80 is distributed to the members of a club (for example, AMERICAN EXPRESS® "Platinum Card" holders or AMERICAN AIRLINES® frequent flyer club members). The promotional content 80, for example, may be first release films that are distributed on a monthly basis as a membership benefit.

Figure 6:
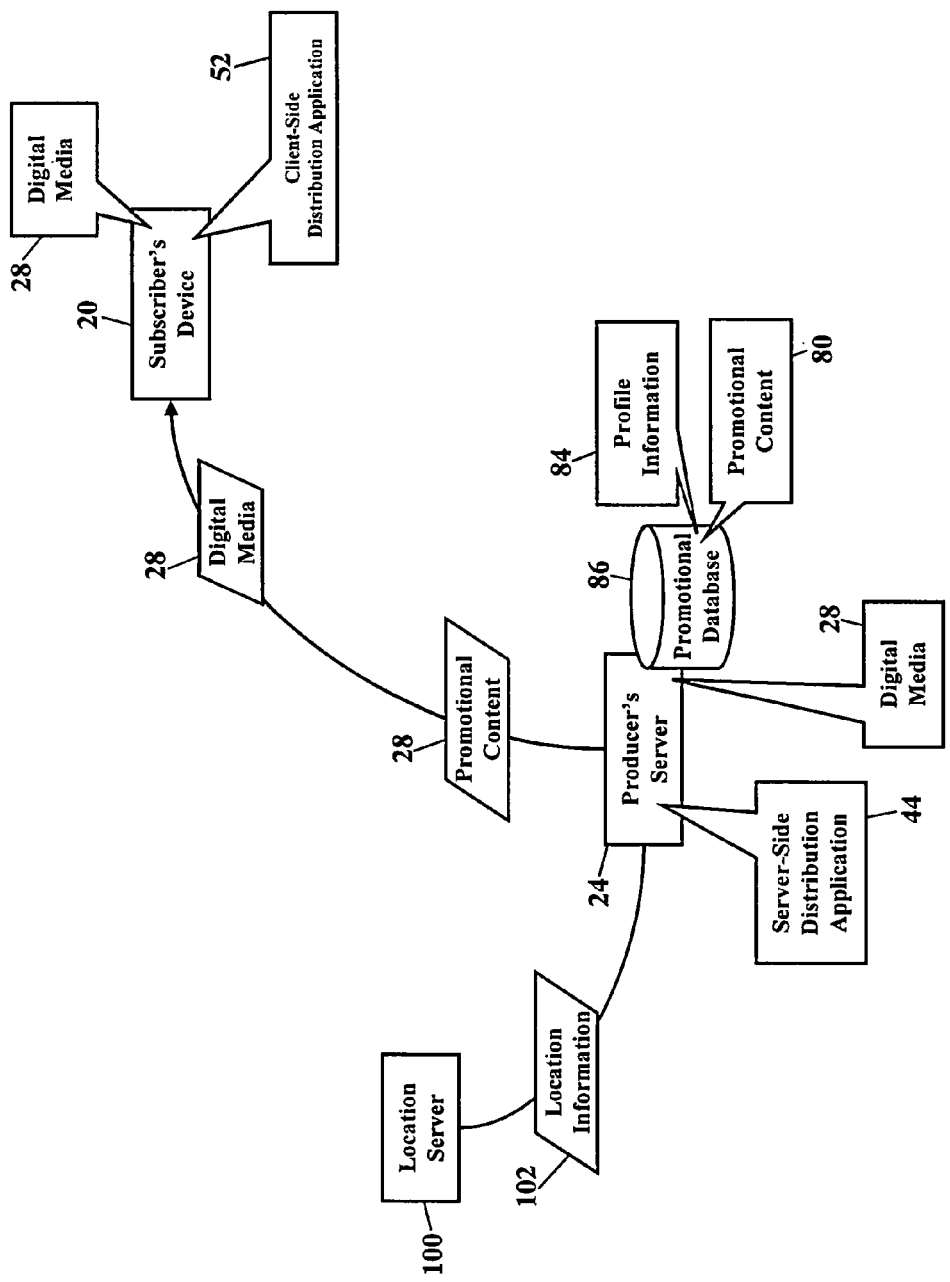
FIG. 6 is a schematic illustrating location considerations for promotional content, according to more exemplary embodiments.

FIG. 6 is a schematic illustrating location considerations for the promotional content 80, according to more exemplary embodiments. When the promotional content 80 is sent to the subscriber's device 20, the promotional content 80 may need to be convenient. If the promotional content 80 is inconvenient for the subscriber, the subscriber may not be enticed to retrieve the digital media 28. Suppose, for example, that the promotional content 80 is a discount coupon or gift certificate for a merchant's physical location, and that physical location is an hour's drive from the subscriber's home. The subscriber may find the promotional content 80 too inconvenient, and thus the promotional content 80 may fail to incentive the subscriber to retrieve the digital media 28.

Exemplary embodiments, then, may select the promotional content 80 based on the subscriber's location. That is, the promotional content 80 may be localized to the subscriber's location, such that the promotional content 80 is convenient to the subscriber. If the subscriber's device 20 is stationary (such as the subscriber's home computer), the location of the subscriber's device 20 may simply be a billing address or physical address associated with the subscriber. The subscriber's device 20, however, may be wireless and/or mobile, such that the subscriber's location may change with time. Regardless, the server-side distribution application 44 may query a location server 100. The location server 100 is a computer system and/or a database that stores location information 102 for the subscriber's device 20. The server-side distribution application 44 queries the location server 100 (via the communications network 24 illustrated in FIG. 1) to obtain the location of the subscriber's device 20. The location server 100 responds with location information 102 associated with the subscriber's device 20. The location information 102 may represent the current location of the subscriber's device 20, or the location information 102 may represent a recent location of the subscriber's device 20. The server-side distribution application 44 may additionally or alternatively query a service provider (such as a wireless network provider) or the subscriber's device 20 for the location of the subscriber's device 20. The location of the subscriber's device 20 may be determined using a global positioning system, triangulation, timed signals, the Doppler effect, or any other method or scheme. How the location of the subscriber's device 20 is determined, however, is beyond the scope of this patent. Those of ordinary skill in the art recognize that various methods of locating the subscriber's device 20 are known and will not be further discussed.

The server-side distribution application 44 receives the location information 102. Once the location of the subscriber's device 20 is known, the server-side distribution application 44 may then use the location information 102 to select and/or to retrieve the promotional content 80. The promotional content 80 may be at least partly selected or determined based on the location information 102 associated with the subscriber's device 20, such that the promotional content 80 is convenient and is more likely to entice the subscriber. The server-side distribution application 44 may query the promotional database 86 for some or all of the profile information 84 and the location information 102. The promotional database 86 then performs a database lookup operation for the profile information 84 and/or for the location information 102. The promotional database 86 then responds with the promotional content 80 associated with the profile information 84 and/or associated with the location information 102. The server-side distribution application 44 may then send or forward the promotional content 80 to the subscriber's device 20.

The promotional content 80 is thus localized to the subscriber's location. The promotional content 80 may be sorted or filtered according to an address associated with the subscriber's device 20. The address may be a billing address of the subscriber, a current address of the subscriber's device 20, or any other address associated with the subscriber's device 20. The address may be any of a house/building number, a street name, a city, a state, a zone improvement plan (ZIP) code, and/or a country. When the promotional content 80, for example, is associated with the subscriber's ZIP code, the promotional content 80 is more likely to be convenient, and enticing, to the subscriber. Coupons, gift certificates, and other promotional content 80 for merchants having the same ZIP code as the subscriber are more likely to incentivize the subscriber to retrieve the digital media 28 from the memory device (illustrated as reference numeral 54 in FIG. 2).

Convenience, however, may not be important for online promotions. When the promotional content 80 is retrievable from a website, the producer may (or may not) consider the subscriber's location. The server-side distribution application 44 may query the promotional database 86 for only the profile information 84. The promotional database 86, for example, may only store information for online merchants. If the promotional content 80 cannot be obtained from an online merchant or website, then the promotional content 80 may be deleted from (or not included in) the promotional database 86. What may be more important, however, is the timing of the promotion. If the producer wants to entice the subscriber to retrieve the digital media 28 on, or near, the date 72 of première or release, the producer may want the promotional content 80 timed to the date 72 of première or release. The server-side distribution application 44 and/or the client-side distribution application 52, for example, may automatically access and download the promotional content 80 on the date 72 of première or release. If the promotional content 80 is candy, flowers, a card, or some other tangible gift, exemplary embodiments may automatically access the merchant's website, and place an electronic order for the promotional content 80, days or weeks ahead of the date 72 of première or release. The server-side distribution application 44 may simply electronically arrange an order with the online merchant such that delivery coincides with the date 72 of première or release.

Figure 7:
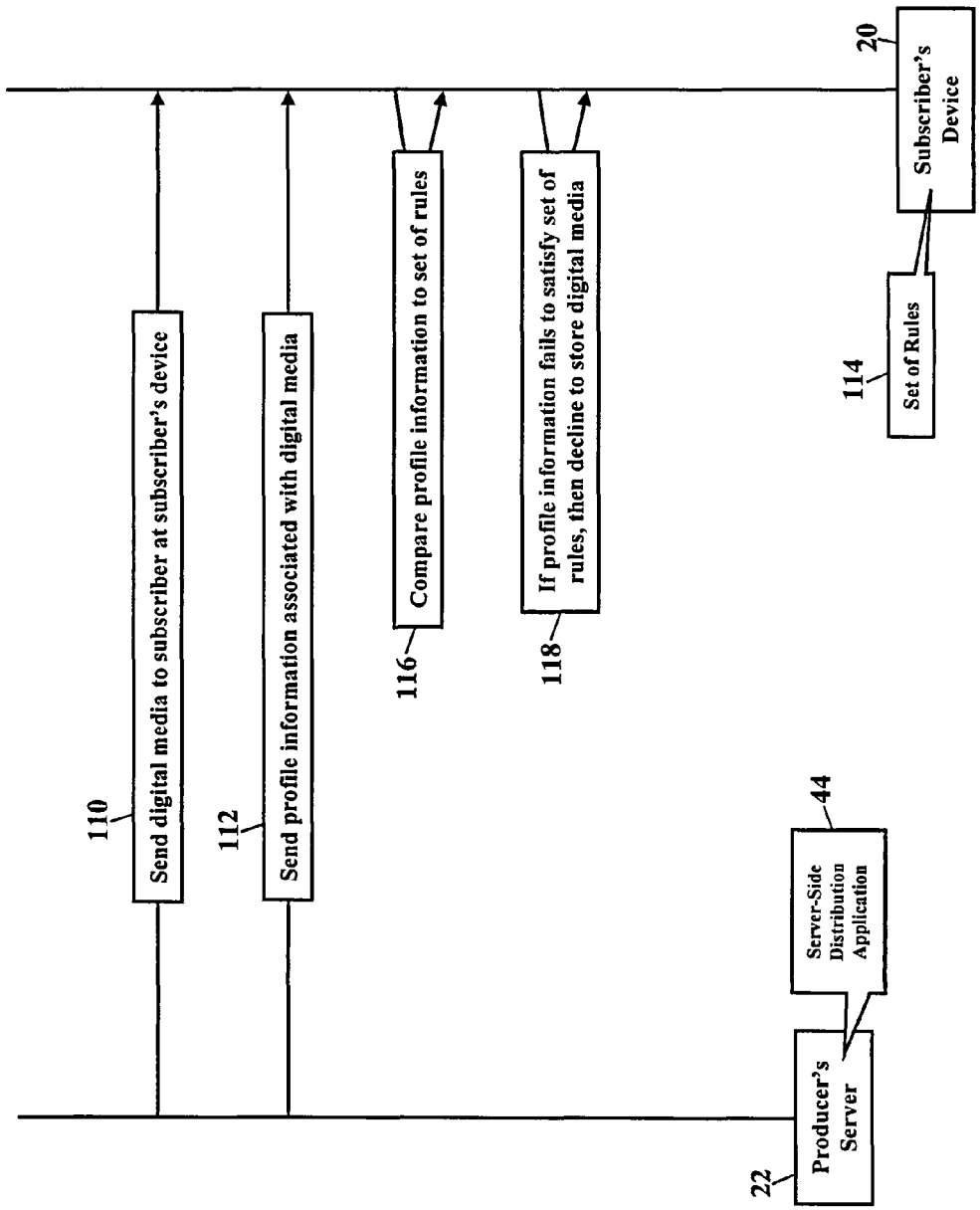
FIGS. 7 and 8 are schematics illustrating a process for distributing the digital media, according to more exemplary embodiments.
Figure 8:
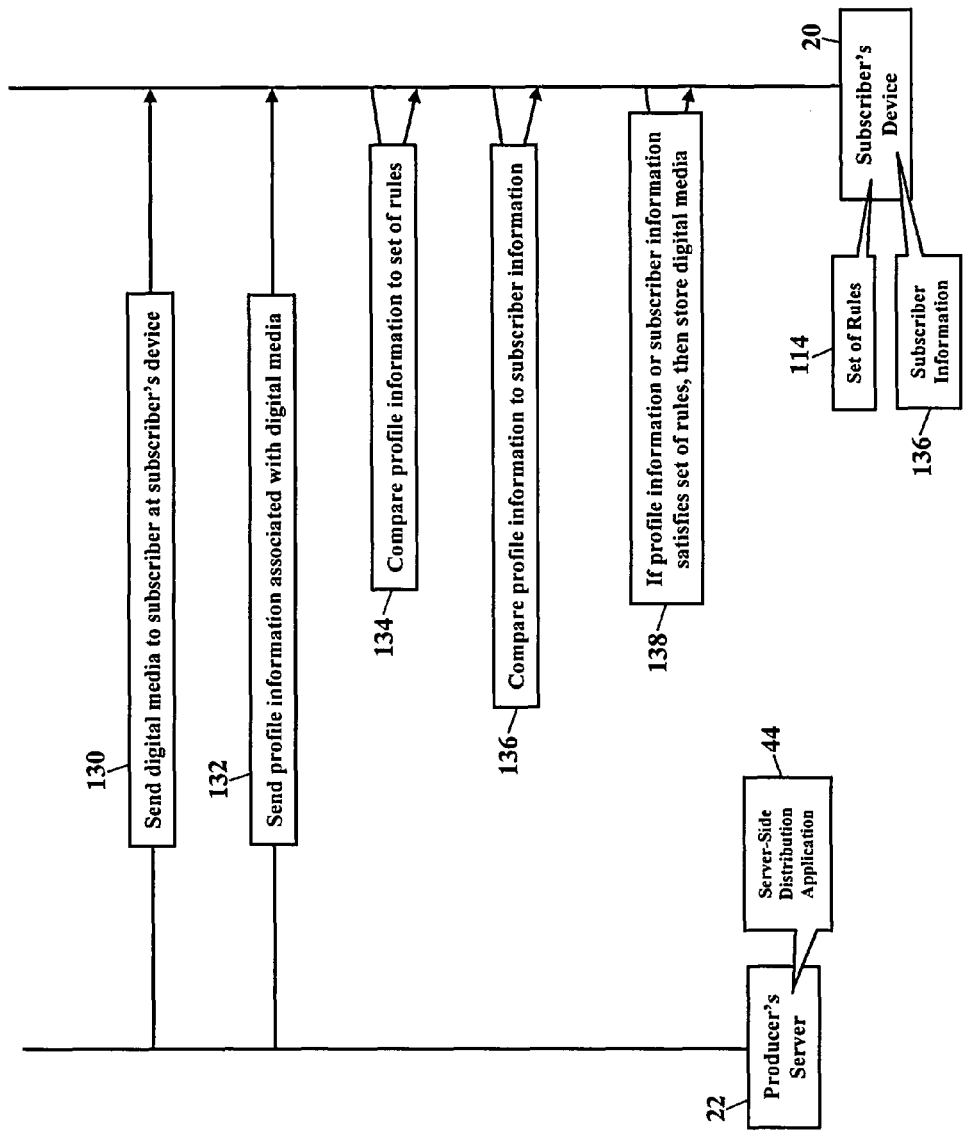

FIGS. 7 and 8 are schematics illustrating a process for distributing the digital media 28, according to more exemplary embodiments. Here the producer's server 22 sends the digital media 28 to the subscriber's device 20 (Block 110). The profile information 84 may also be sent (Block 112). The profile information 84 includes the profile information 84 that describes the digital media 28 (e.g., theme, genre, actor(s), actress(es), rating). When the subscriber's device 20 receives the profile information 84, the client-side distribution application 52 may compare the profile information 84 to a set 114 of rules stored in the subscriber's device 20 (Block 116). The set 114 of rules determines which of the new releases of media offered by the producer is stored in the partitioned portion of the memory device (illustrated, respectively, as reference numerals 56 and 54 in FIG. 2). If any, some, or all of the profile information 84 fails to satisfy the set 114 of rules, then exemplary embodiments may decline to store the newly-released digital media 28 in the partitioned portion 56 of the memory device 54 (Block 118). The set 114 of rules, for example, may prohibit "R" and/or "X" rated content. The set 114 of rules may permit the storage of all media associated with DISNEY®, Annie Leibovitz, Robert Redford, George Lucas, or any other entity. The subscriber may configure the set 114 of rules to establish filters, thresholds, or parameters that allow storage of the digital media 28 in the partitioned portion 56 of the memory device 54.

FIG. 8 illustrates another process for distributing the digital media 28, according to more exemplary embodiments. Here the producer's server 22 again sends the digital media 28 (Block 130), and/or the profile information 84 (Block 132), to the subscriber's device 20. When the subscriber's device 20 receives the profile information 84, the client-side distribution application 52 may compare the profile information 84 to the set 114 of rules (Block 134) and/or to subscriber information 136 (Block 138) stored in the subscriber's device 20. The subscriber information 136 may be any information that helps determine the subscriber's preferences for media. The subscriber information 136 may be general or detailed, anonymous or revealing. The subscriber information 136, for example, may be anonymous demographic information, such as the subscriber's age, income, sex, or occupation. If the client-side distribution application 52 determines that any of the digital media's profile information 84 matches the subscriber information 136, then the digital media 28 may appeal to the subscriber. Exemplary embodiments may then permit the client-side distribution application 52 to store the newly-released digital media 28 in the partitioned portion of the memory device (illustrated, respectively, as reference numerals 56 and 54 in FIG. 2) (Block 138). The subscriber information 136 may be more detailed and specify necessary components of the profile information 84. If the profile information lacks a necessary component, then exemplary embodiments may decline to store the newly-released digital media 28 in the partitioned portion 56 of the memory device 54. Because the producer may send many films, games, and/or other digital media 28 for storage to the subscriber's device 20, the subscriber may configure the set 114 of rules and/or the subscriber information 136 to filter or discard unwanted or undesirable content.

Figure 9:
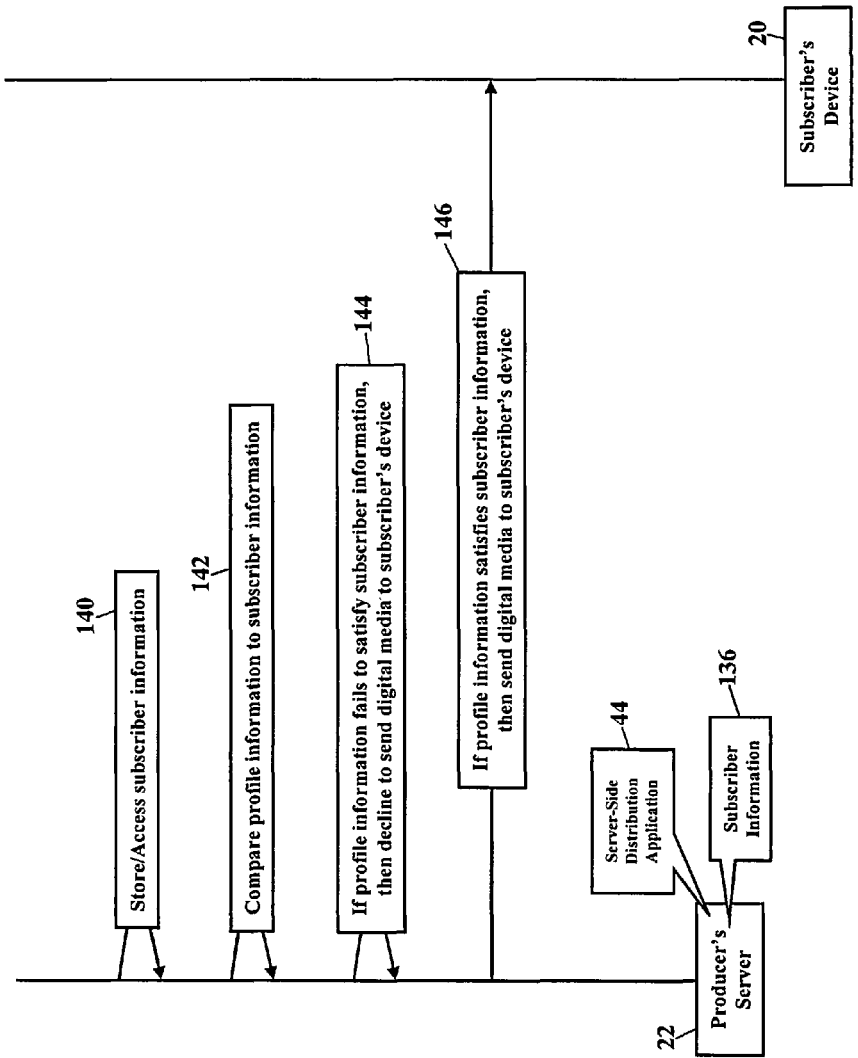
FIG. 9 is a schematic illustrating yet another process for distributing the digital media, according to even more exemplary embodiments.

FIG. 9 illustrates yet another process for distributing the digital media 28, according to even more exemplary embodiments. Here exemplary embodiments use the profile information 84 to determine what digital media is delivered to the subscriber's device 20. That is, the producer's server 22 uses the profile information 84 to target what subscribers should receive the digital media 28. The server-side distribution application 44, operating in the producer's server 22, may store or access the subscriber information 136 associated with the subscriber (Block 140). The server-side distribution application 44 compares the profile information 84 to the subscriber information 136 (Step 142). If any, some, or all of the profile information 84 fails to satisfy the subscriber information 136, then exemplary embodiments may decline to send or distribute the digital media 28 to the subscriber's device 20 (Block 144). Conversely, if any, some, or all of the profile information 84 satisfies the subscriber information 136, then exemplary embodiments may distribute the digital media 28 to the subscriber's device 20 (Block 146). The subscriber's device 20 may then store the digital media 28 in the partitioned portion of the memory device (illustrated, respectively, as reference numerals 56 and 54 in FIG. 2).

Figure 10:
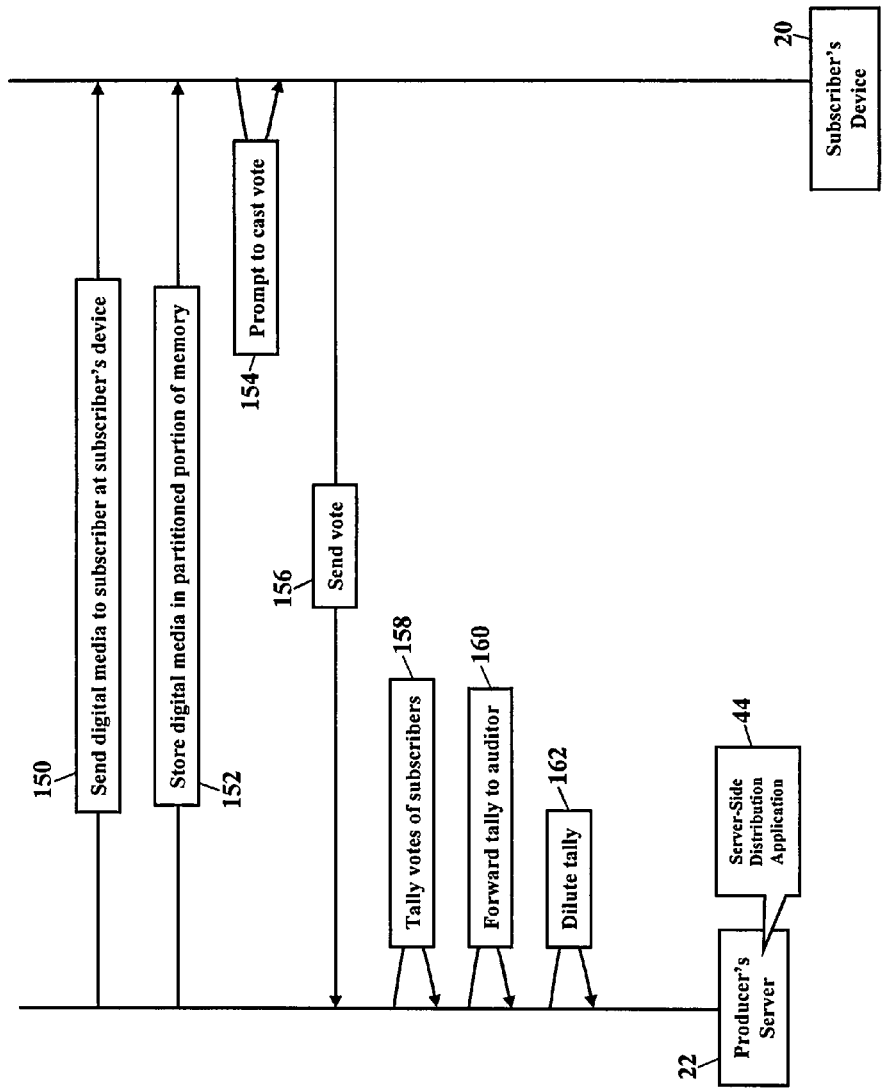
FIG. 10 is another schematic illustrating the process for distributing the digital media, according to more exemplary embodiments.

FIG. 10 is another schematic illustrating the process for distributing the digital media 28, according to more exemplary embodiments. Here, balloting in an election campaign is used to incentivize the subscriber to retrieve the digital media 28 from the partitioned portion of the memory device (illustrated, respectively, as reference numerals 56 and 54 in FIG. 2). If the subscriber fully retrieves the digital media 28 from the partitioned portion 56 of the memory device 54, then exemplary embodiments may permit the subscriber to submit a ballot, or vote, in the election campaign. The election campaign may be popularity contest, a critical review, or any other campaign in which the subscriber's vote or views may be tallied.

As FIG. 10 illustrates, the producer's server 22 sends the digital media 28 to the subscriber's device 20 (Block 150). The digital media 28 is stored in the partitioned portion 56 of the memory device 54 (Block 152). When the digital media 28 is entirely retrieved from the partitioned portion 56 of the memory device 54, then the subscriber may be prompted to cast a vote (Block 154). The vote may represent the subscriber's recommendation or critical review of the movie, game, or other digital media 28. The subscriber may cast the vote using browser to access a website. The subscriber may cast the vote via an interactive cable or IPTV application. One of ordinary skill in the art understands that there are many mechanisms for casting the subscriber's vote. Regardless, the client-side distribution application 52 sends the vote to the server-side distribution application 44 (Block 156). The server-side distribution application 44 counts, sums, or tallies the vote along with the votes of other subscribers retrieving the same digital media 28 (Block 158).

The election campaign, for example, may be the ACADEMY AWARDS®. Most every year the ACADEMY OF MOTION PICTURE ARTS AND SCIENCES® conducts an election campaign for excellence in film-making. Ordinarily, though, only honorary members have voting privileges. Exemplary embodiments, however, present a distribution scheme in which subscribers to the distribution plan may also cast votes for the ACADEMY AWARDS®.

Exemplary embodiments incentivize the subscriber to retrieve and entirely watch the producer's digital media 28. If the subscriber entirely retrieves the producer's digital media 28, the subscriber may be rewarded with a vote in the ACADEMY AWARDS®. Exemplary embodiments, then, offer the general public a chance to nominate their favorite movies, actors, actresses, and other categories. So, when the server-side distribution application 44 tallies the subscribers' votes (Block 158), the server-side distribution application 44 may forward the tally count to an auditor or other entity that receives ballots for the ACADEMY AWARDS® (Block 160). Exemplary embodiments may, additionally or alternatively, send the subscriber's vote directly to the auditor for tabulation. The subscriber's vote may also be an opportunity to provide a consumer rating or evaluation of the digital media 28.

Exemplary embodiments may dilute the subscribers' votes (Block 162). As the above paragraph mentioned, ordinarily only the Academy's honorary members have voting privileges. These honorary members have the skills and talents to recognize the year's superior achievements in film-making. The general public, however, may not recognize those qualities and/or achievements that truly deserve an ACADEMY AWARD®. Exemplary embodiments, then, may dilute the subscribers' votes so as to maintain the expertise, and votes, of the honorary members. The subscribers' votes, for example, may be so diluted (e.g., 1:1,000,000) that the 6,000 or so honorary members always maintain greater voting power, regardless of how many subscribers cast ballots. More likely, however, is a scheme in which the subscribers' votes may determine an outcome of the awards. If the subscribers' votes are only moderately diluted (e.g., 1:10,000), then an individual subscriber may feel their vote is determinate.

Exemplary embodiments also include "co-releasing" content and the promotional content 80. A producer may pre-distribute the digital media 28 and its associated promotional content 80 in anticipation of some event or marketing opportunity. When that anticipated event or opportunity arises, the subscriber's device 20 is already preloaded with the producer's content. Suppose, for example, that Martin Scorsese has been nominated for an ACADEMY AWARD®. A producer of any of Mr. Scorsese's films may hope to capitalize on the excitement surrounding Mr. Scorsese's nomination. The producer, then, may pre-distribute one, some, or all of Mr. Scorsese's films to the subscriber's device 20. The producer may also pre-distribute the promotional content 80 that promotes Mr. Scorsese's films. Should Mr. Scorsese win the ACADEMY AWARD®, then the producer may immediately alert subscribers to the pre-loaded content. That is, within minutes of Mr. Scorsese winning the ACADEMY AWARD®, the subscriber's device 20 may be immediately notified to begin presenting the promotional content 80 that promotes Mr. Scorsese's films. The promotional material alerts the subscriber that Mr. Scorsese's films are already pre-loaded on the subscriber's device 20 and available for immediate enjoyment.

Notifications, of course, may be provided for any content. Whenever the producer distributes the digital media 28 to the subscriber's device 20, the subscriber may be notified of the digital media 28. As soon as the digital media 28 is stored in the subscriber's device 20, for example, the client-side distribution application 52 may cause a notification to be presented on the display device 62. The notification may be a "pop up" dialog box that informs the subscriber that TAXI DRIVERS®(or any other movie or game) is now available for immediate viewing. The notification may be produced by a locally-generated on-screen TV guide for IPTV, cable networking, or any other implementation.

Figure 11:
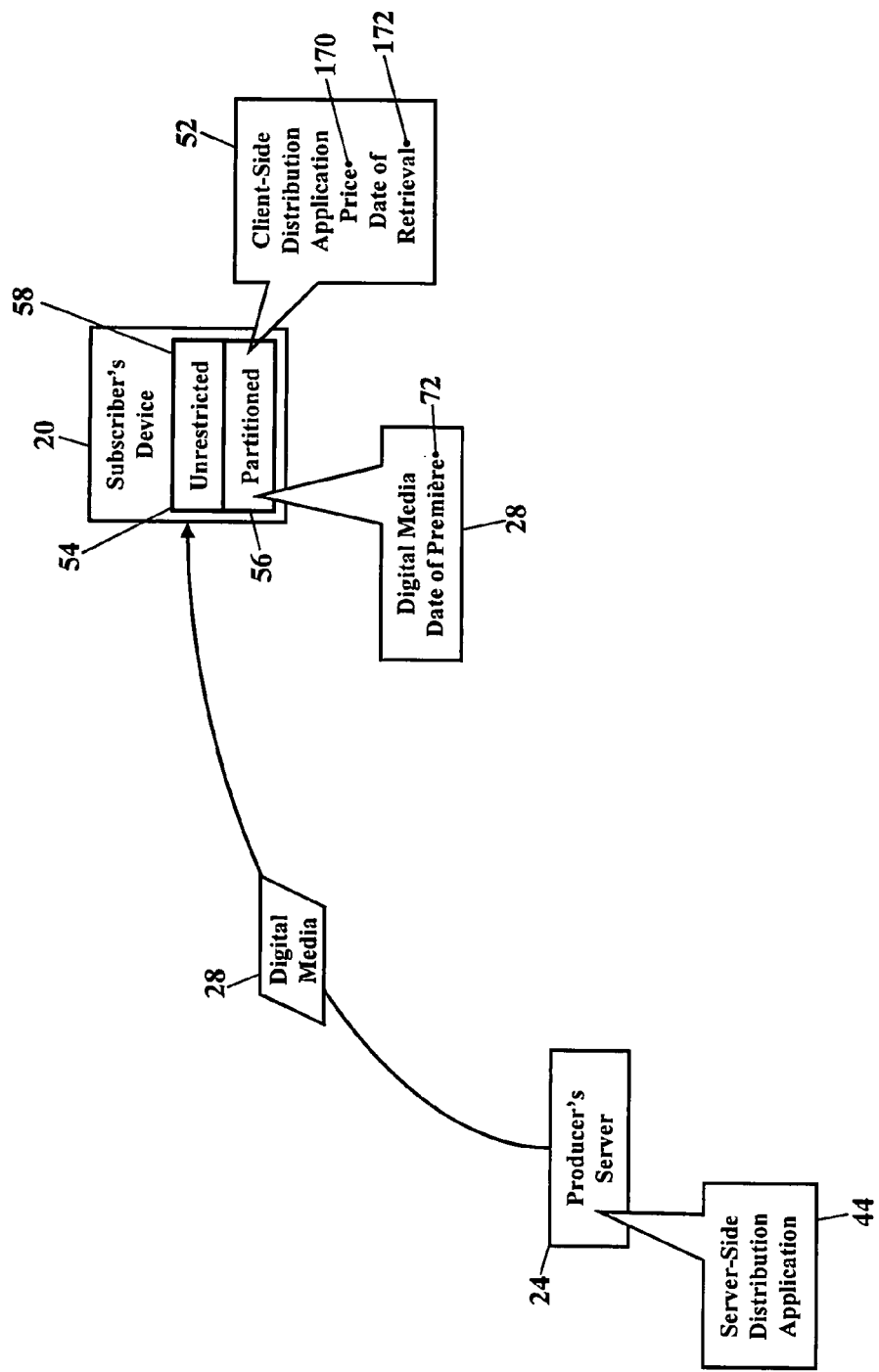
FIG. 11 is another schematic illustrating distribution of the digital media, according to even more exemplary embodiments.

FIG. 11 is another schematic illustrating distribution of the digital media 28, according to even more exemplary embodiments. Here, when the subscriber's device 20 retrieves the digital media 28 from the partitioned portion 56 of the memory device 54, the subscriber may be charged a fee or price 170. The price 170 may be a flat fee, regardless of a date 172 of retrieval. Exemplary embodiments, however, may determine the price 170 according to the date 172 of retrieval. Exemplary embodiments, for example, may charge a highest price on or near the date 72 of première or release. The producer may charge the highest price to those subscribers who must experience the movie, game, or other digital media 28 on or near the date 72 of première or release. The producer may then implement a discounted pricing scheme, in which the price 170 is reduced when retrieval occurs on dates later than the date 72 of première or release. Every two days, every week, or some other periodic or random interval the producer may reduce the price 170 of retrieval. The price 170, in other words, may be discounted according to each day or days, measured from the date 72 of première or release. Exemplary embodiments may calculate a calendar difference (e.g., days, weeks, or months) from the date 72 of première or release to the date 172 of retrieval. The greater the calendar difference, then perhaps the lesser the price 170 for retrieving the digital media 28. "Sales" or other promotional opportunities may be offered before the digital media 28 is removed, overwritten, or deleted from the subscriber's device 20 and/or the producer's server 22.

Exemplary embodiments may be subsidized. The producer, for example, may sponsor or provide the subscriber's device 20, such that only the producer's digital media 28 may be stored in the partitioned portion 56 of the memory device 54. If the subscriber is charged a monthly or other periodic fee for the distribution plan, the producer may subsidize the monthly/periodic fee. If the subscriber agrees to dedicate the partitioned portion 56 to the producer's digital media 28, then the producer may subsidize some, or all, of the purchase price of the memory device 54 and/or of the subscriber's device 20. If the subscriber buys the subscriber's device 20, and then agrees to dedicate the partitioned portion 56 to the producer's digital media 28, then the producer may refund some, or all, of the purchase price. The producer, in short, may subsidize the subscriber's monthly fee, equipment fee, service charges, or any other charge or fee as an incentive to the subscriber. A network provider or a service provider, likewise, may subsidize the subscriber's device 20 or any fees for the digital media 28. A network provider of the communications network 24, for example, may team with the producer to cross-market each other's services and products.

Figure 12:
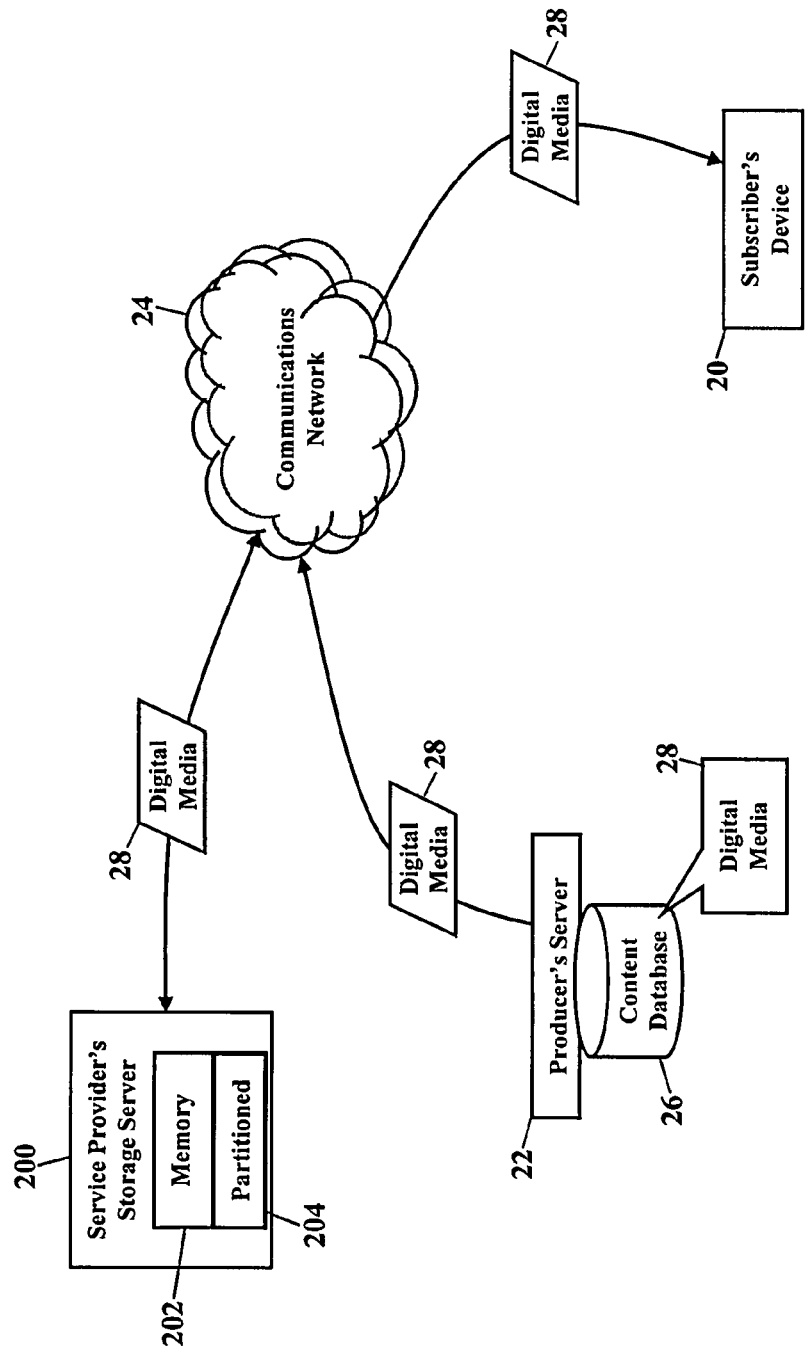
FIG. 12 is another schematic illustrating distribution of the digital media, according to even more exemplary embodiments.

FIG. 12 is another schematic illustrating distribution of the digital media 28, according to even more exemplary embodiments. FIG. 12 illustrates a network-centric version in which the digital media 28 is stored in service provider's network storage. Here the subscriber's device 20 communicates with the producer's server 22 and with a service provider's networked storage server 200. The service provider, for example, may provide a recording or storage service in which the subscriber's content is stored and maintained in memory 202 of the storage server 200. Here, then, when the producer wishes to distribute the digital media 28, the producer's server 22 retrieves the digital media 28 from the content database 26 and sends the digital media 28 to the service provider's storage server 200. When the storage server 200 receives the digital media 28, the storage server 200 stores the digital media 28 in a dedicated, partitioned portion 204 of the memory 202. Again, only the producer's content may be storable and retrievable from the partitioned portion 204 of the memory 202.

When the subscriber wishes to enjoy the digital media 28, the client-side distribution application 52 communicates with the service provider's storage server 200. An authentication procedure (such as a username and password) may be required to access the partitioned portion 204 of the memory 202. When the subscriber is authenticated, the subscriber may then retrieve the digital media 28 from the partitioned portion 204 of the memory 202. Access, however, may be restricted or prevented prior to the specified date/time (such as the date 72 of première). At the specified time/date, then, the digital media 28 may then be retrieved from the partitioned portion 204 of the memory 202 and sent to the subscriber's device 20. The client-side distribution application 52 and/or the service provider's storage server 200 may also provide notifications when the subscriber accesses the digital media 28 (as earlier paragraphs explained). If the partitioned portion 204 of the memory 202 is limited in size, the subscriber may be prompted to select what digital media 28 is deleted or transferred (again as earlier paragraphs explained).

Figure 13:
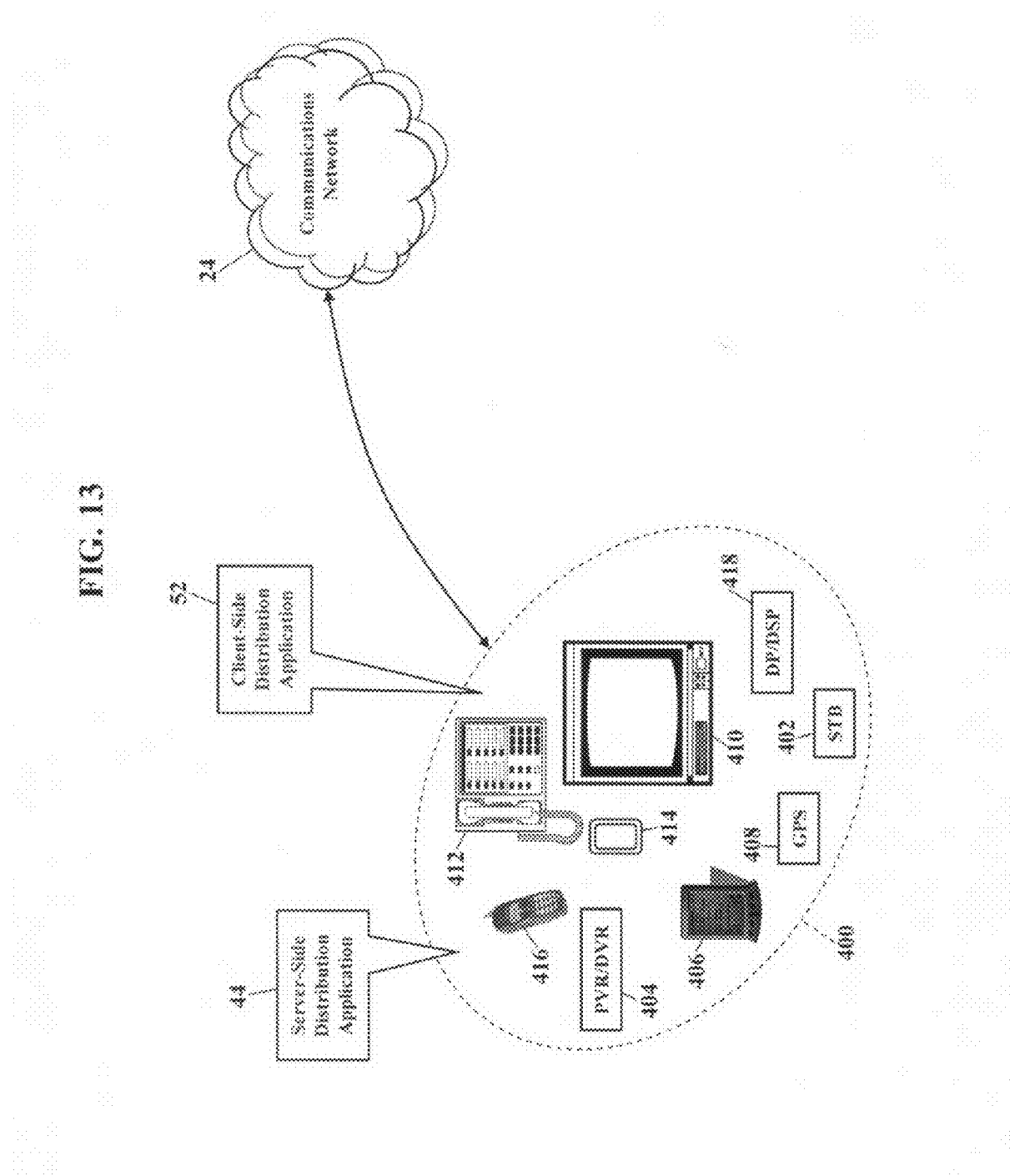
FIG. 13 depicts other possible operating environments for additional aspects of the exemplary embodiments.

FIG. 13 depicts other possible operating environments for additional aspects of the exemplary embodiments. FIG. 13 illustrates that the server-side distribution application 44 and/or the client-side distribution application 52 may alternatively or additionally operate within various other devices 400. FIG. 13, for example, illustrates that the server-side distribution application 44 and/or the client-side distribution application 52 may entirely or partially operate within a set-top box (402), a personal/digital video recorder (PVR/DVR) 404, personal digital assistant (PDA) 406, a Global Positioning System (GPS) device 408, an interactive television 410, an Internet Protocol (IP) phone 412, a video-enabled phone 414 (such as an APPLE® iPhone™), a cellular/satellite phone 416, or any computer system and/or communications device utilizing a digital processor and/or a digital signal processor (DP/DSP) 418. The device 400 may also include watches, radios, vehicle electronics, clocks, printers, gateways, and other apparatuses and systems. Because the architecture and operating principles of the various devices 400 are well known, the hardware and software componentry of the various devices 400 are not further shown and described. If, however, the reader desires more details, the reader is invited to consult the following sources: ANDREW TANENBAUM, COMPUTER NETWORKS ($4^{th}$ edition 2003); WILLIAM STALLINGS, COMPUTER ORGANIZATION AND ARCHITECTURE: DESIGNING FOR PERFORMANCE ($7^{th}$ Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004); LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, ITV HANDBOOK: TECHNOLOGIES AND STANDARDS (2004).

Figure 14:
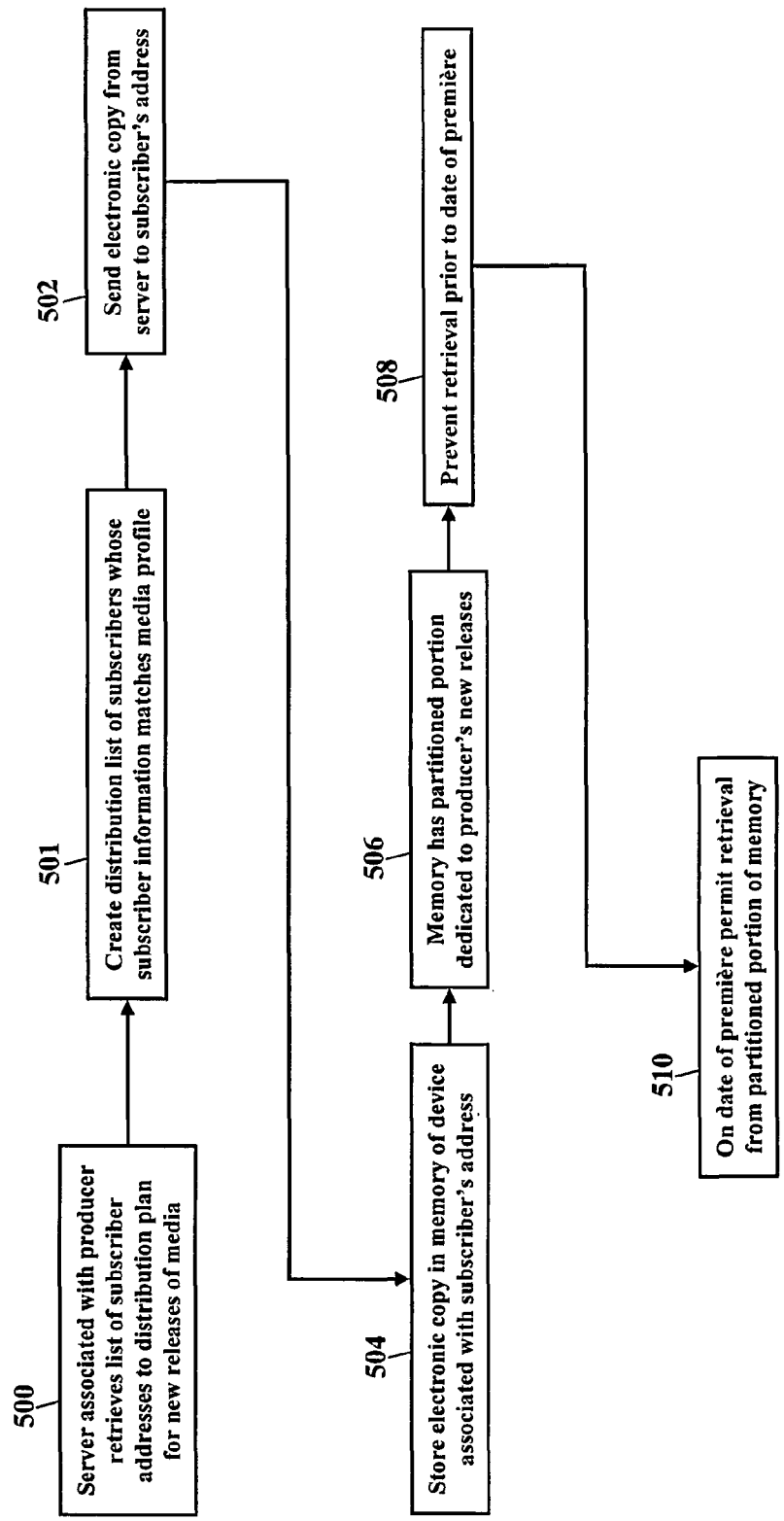
FIG. 14 is a flowchart illustrating a method of distributing digital media, according to still more exemplary embodiments.

FIG. 14 is a flowchart illustrating a method of distributing digital media, according to still more exemplary embodiments. A server associated with a producer retrieves a list of subscriber addresses to a distribution plan for new releases of media (Block 500). An electronic copy of the media is sent from the server to a subscriber's address in the list of subscribers (Block 502). The electronic copy of the media is stored in a memory of a device associated with the subscriber's address (Block 504). The memory has a partitioned portion that is dedicated to the new releases of media offered by the producer, such that the new release of media is only storable and retrievable from the partitioned portion of the memory (Block 506). Retrieval of the new release of the media is prevented prior to a date of première (Block 508). On the date of première, the new release of the media is made retrievable from the partitioned portion of the memory (Block 510).

Figure 15:
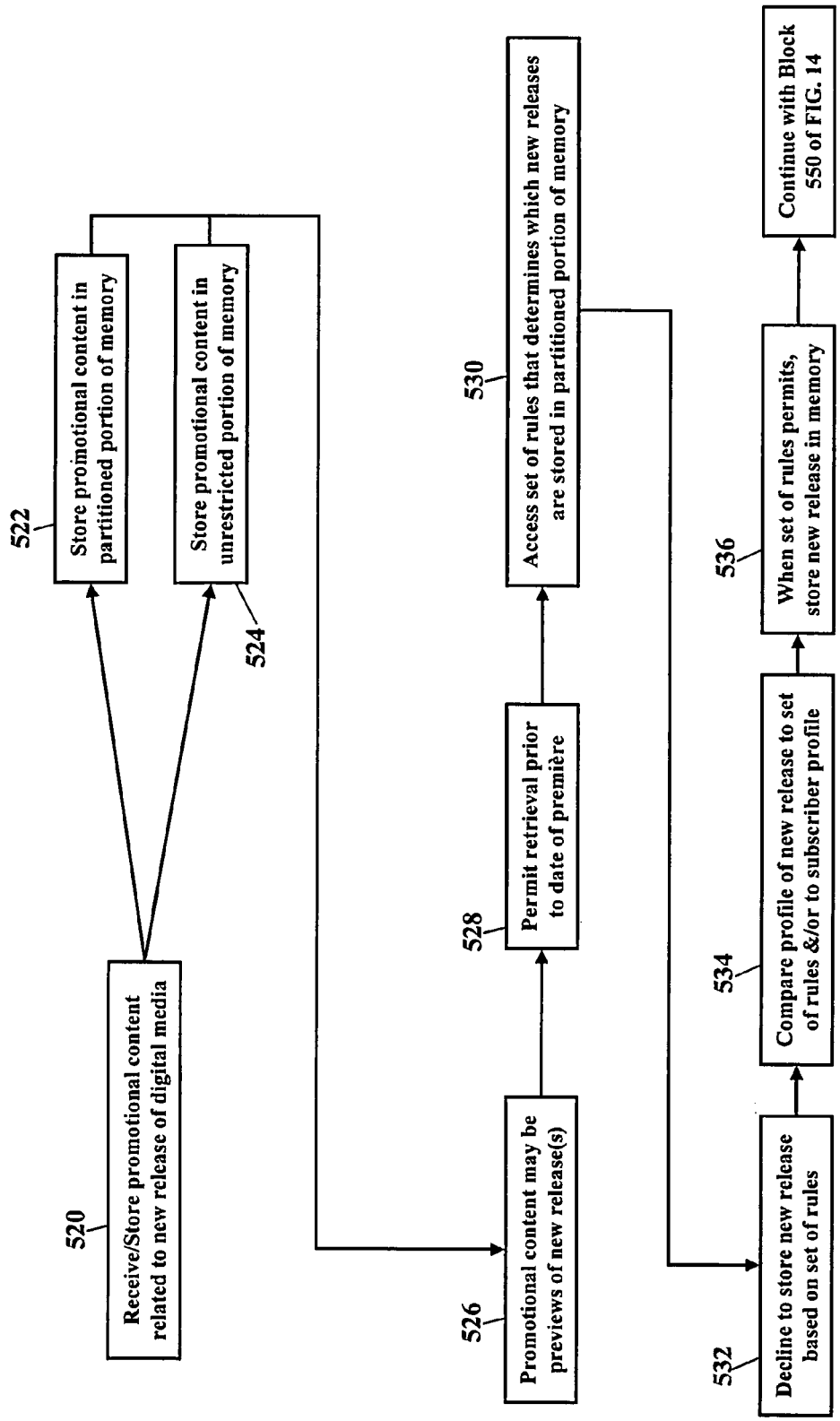
FIGS. 15 and 16 are additional flowcharts illustrating the method of distributing digital media, according to still more exemplary embodiments.
Figure 16:
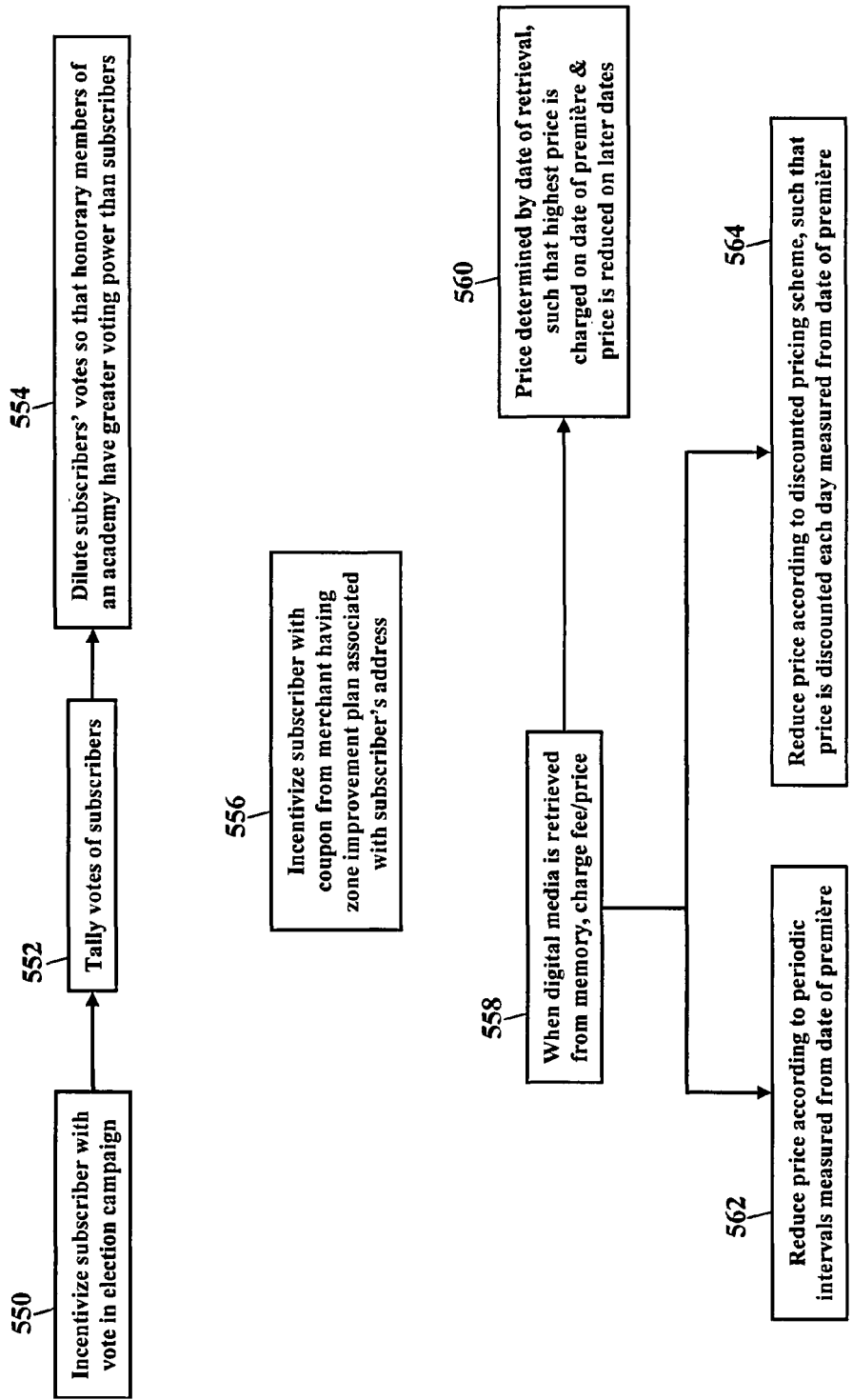

FIGS. 15 and 16 are additional flowcharts illustrating the method of distributing digital media, according to still more exemplary embodiments. Promotional content 80, related to a new release of digital media, is received and stored (Block 520). The promotional content 80 may be stored in the partitioned portion 56 of the memory device 54 (Block 522). Some (or all) of the promotional content 80, however, may be stored in the undedicated or unrestricted portion 54 of the memory device 54 (Block 524). The promotional content 80 may be a preview of the new release of the digital media and/or previews of other new releases (Block 526). The promotional content 80 may be retrieved prior to a date of the date 72 of première or release (Block 528). A set 114 of rules stored in the memory may be accessed that determines which of the new releases of media offered by the producer is stored in the partitioned portion 56 of the memory device 54 (Block 530). Exemplary embodiments may decline to store a new release in the partitioned portion 56 of the memory device 54, based on the set 114 of rules (Block 532). A profile of the new release of the digital media 28 may be compared to set 114 of rules and to a subscriber profile (Block 534). When the set 114 of rules permits, the new release of the digital media 28 may be stored in the partitioned portion 56 of the memory device 54 (Block 536).

The flowchart continues with FIG. 16. The subscriber may be incentivized to retrieve the new release of the digital media 28 from the partitioned portion 56 of the memory device 54, the incentive comprising a vote in an election campaign (Block 550). The votes of the subscribers, who retrieve the new releases of the digital media 28 offered by the producer, are tallied (Block 552). The subscribers' votes may be diluted such that honorary members of an academy have greater voting power than the subscribers (Block 554). The subscriber may be incentivized with a coupon from a merchant having a zone improvement plan associated with the subscriber's address (Block 556). When the digital media 28 is at least partially retrieved from partitioned portion 56 of the memory device 54, a fee or price may be charged for the retrieval (Block 558). The price may be determined by a date of retrieval, such that a highest price is charged on the date of the première or release, and the price is reduced on dates later than the date 72 of première or release (Block 560). The price may be reduced according to periodic intervals measured from the date 72 of première or release (Block 562). The price may be reduced according to a discounted pricing scheme, such that the price is discounted each day measured from the date 72 of première or release (Block 564).

Exemplary embodiments may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. These types of computer-readable media, and other types not mention here but considered within the scope of the exemplary embodiments. A computer program product comprises processor-executable instructions for new releases of digital media.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of distributing digital media, comprising:
   retrieving, at a server associated with a producer, a list of subscriber addresses to a distribution plan for new releases of media, such that only authorized subscribers to the distribution plan receive a new release of media;
   sending an electronic copy of the new release of media from the server to a client device at a subscriber's address in the list of subscribers;
   partitioning memory in the client device for different producers of digital media;
   dedicating a partitioned portion of the memory in the client device to each of the different producers;
   storing the electronic copy of the new release of media in the partitioned portion of the memory that is dedicated to the producer, such that the new release of media is only storable to and retrievable from the partitioned portion of the memory associated with the producer;
   transferring the electronic copy of the new release of media from the partitioned portion of the memory to another memory location in response to a purchase of the electronic copy of the new release of media;
   retrieving a date of première of the electronic copy of the new release of media;
   comparing a date of purchase of the electronic copy of the new release of media to the date of première;
   calculating a calendar difference from the date of première to the date of purchase;
   retrieving a purchase price for the electronic copy of the new release of media;
   determining a number of bi-daily intervals in the calendar difference; and
   discounting the purchase price according to the number of bi-daily intervals in the calendar difference.

2. The method according to claim 1, further comprising preventing retrieval of the new release of media prior to the date of première.

3. The method according to claim 2, wherein on the date of première, making the new release of media retrievable from the partitioned portion of the memory.

4. The method according to claim 1, further comprising receiving and storing promotional content that is related to the new release of media.

5. The method according to claim 4, further comprising retrieving the promotional content selected from the group consisting of a video clip, a game, educational content, a coupon, and a printable sticker.

6. The method according to claim 4, further comprising retrieving, prior to the date of première of the new release of media, the promotional content from the partitioned portion of the memory.

7. The method according to claim 4, further comprising retrieving a preview of the new release of media.

8. The method according to claim 7, wherein retrieving the promotional content comprises retrieving previews of other new releases.

9. The method according to claim 1, further comprising accessing a set of rules stored in the memory, the set of rules determining which ones of the new releases of media offered by the producer is stored in the partitioned portion of the memory.

10. The method according to claim 9, further comprising declining to store media in the partitioned portion of the memory, based on the set of rules.

11. The method according to claim 9, further comprising:
   comparing the set of rules and a subscriber profile to a profile of the new release of media; and
   when the set of rules permits, storing the new release of media in the partitioned portion of the memory.

12. The method according to claim 1, further comprising incentivizing a subscriber to retrieve the new release of media from the partitioned portion of the memory with a vote in an election campaign.

13. The method according to claim 12, further comprising tallying votes of subscribers who retrieve the new release of media offered by the producer.

14. The method according to claim 13, further comprising diluting the votes of the subscribers in the election campaign, such that honorary members of an academy have greater voting power than the subscribers.

15. The method according to claim 1, further comprising incentivizing a subscriber to retrieve the new release of media from the partitioned portion of the memory with a coupon from a merchant having a zone improvement plan associated with the subscriber's address.

16. A system, comprising:
a processor; and
a memory storing code that when executed causes the processor to perform operations, the operations comprising:
receiving an electronic copy of a new release of media at a client device, the client device having an address associated with a distribution plan of a producer that distributes the new release of media to a list of subscribers;
partitioning the memory in the client device to different producers of digital media;
dedicating a partitioned portion of the memory in the client device to each of the different producers;
storing the electronic copy of the new release of media in the partitioned portion of the memory that is dedicated to content offered by the producer, such that the new release of media is only storable and retrievable from the partitioned portion of the memory associated with the producer;
incentivizing retrieval of the new release of media from the partitioned portion of the memory with a vote in an election campaign and with a coupon from a merchant having a zone improvement plan associated with the subscriber;
generating a prompt to purchase the electronic copy of the new release of media;
retrieving the electronic copy of the new release of media from the partitioned portion of the memory;
retrieving a date of première of the electronic copy of the new release of media;
comparing a date of purchase of the electronic copy of the new release of media to the date of première;
calculating a calendar difference from the date of première to the date of purchase;
retrieving a purchase price for the electronic copy of the new release of media;
determining a number of bi-daily intervals in the calendar difference; and
discounting the purchase price according to the number of bi-daily intervals in the calendar difference;
tallying votes of subscribers who purchase the new release of media offered by the producer; and
diluting the votes of the subscribers in the election campaign such that honorary members of an academy have greater voting power than the subscribers.

17. A non-transitory computer readable medium storing processor executable instructions for performing a method of distributing digital media, the method comprising:
retrieving a list of subscriber addresses to a distribution plan for new releases of media, such that only authorized subscribers to the distribution plan receive a new release of media;
sending an electronic copy of the new release of media from a server to a client device at a subscriber's address in the list of subscribers;
partitioning memory in the client device to different producers of digital media;
dedicating each partitioned portion of the memory in the client device to a different producer of digital media;
dedicating a partitioned portion of the memory to the producer;
storing the electronic copy of the new release of media in the partitioned portion of memory that is dedicated to the new releases of media offered by the producer, such that the new release of media is only storable and retrievable from the partitioned portion of the memory associated with the producer;
incentivizing a subscriber to retrieve the new release of media from the partitioned portion of the memory with a vote in an election campaign and with a coupon from a merchant having a zone improvement plan associated with the subscriber;
generating a prompt to purchase the electronic copy of the new release of media;
retrieving the electronic copy of the new release of media from the partitioned portion of the memory;
retrieving a date of première of the electronic copy of the new release of media;
comparing a date of purchase of the electronic copy of the new release of media to the date of première;
calculating a calendar difference from the date of premiè to the date of purchase;
retrieving a purchase price for the electronic copy of the new release of media;
determining a number of bi-daily intervals in the calendar difference; and
discounting the purchase price according to the number of bi-daily intervals in the calendar difference;
tallying votes of subscribers who purchase the new release of media offered by the producer; and
diluting the votes of the subscribers in the election campaign such that honorary members of an academy have greater voting power than the subscribers.

* * * * *